(12) United States Patent
Szilagyi et al.

(10) Patent No.: US 9,936,409 B2
(45) Date of Patent: Apr. 3, 2018

(54) ANALYZING AND CLASSIFYING SIGNALING SETS OR CALLS

(71) Applicant: NOKIA SOLUTIONS AND NETWORKS OY, Espoo (FI)

(72) Inventors: Peter Szilagyi, Budapest (HU); Szabolcs Novaczki, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/545,879

(22) PCT Filed: Jan. 26, 2015

(86) PCT No.: PCT/EP2015/051429
§ 371 (c)(1),
(2) Date: Jul. 24, 2017

(87) PCT Pub. No.: WO2016/119812
PCT Pub. Date: Aug. 4, 2016

(65) Prior Publication Data
US 2017/0359743 A1 Dec. 14, 2017

(51) Int. Cl.
*H04W 24/00* (2009.01)
*H04W 24/08* (2009.01)
(Continued)

(52) U.S. Cl.
CPC ............ *H04W 24/08* (2013.01); *H04L 41/14* (2013.01); *H04W 84/042* (2013.01)

(58) Field of Classification Search
CPC ...... H04W 24/08; H04W 84/042; H04L 41/14
(Continued)

(56) References Cited

U.S. PATENT DOCUMENTS 7,522,060 B1 * 4/2009 Tumperi .............. G06Q 10/06
340/5.82
7,764,959 B2 * 7/2010 Jaquet .................. H04W 24/08
455/423
(Continued)

FOREIGN PATENT DOCUMENTS

JP 2013-214859 A 10/2013

OTHER PUBLICATIONS

International Search Report and Written Opinion dated Nov. 9, 2015 corresponding to International Patent Application No. PCT/EP2015/051429.

*Primary Examiner* — Marceau Milord
(74) *Attorney, Agent, or Firm* — Squire Patton Boggs (US) LLP

(57) ABSTRACT

An apparatus comprising at least one processing circuitry, and at least one memory for storing instructions to be executed by the processing circuitry, wherein the at least one memory and the instructions are configured to, with the at least one processing circuitry, cause the apparatus at least: to analyze a plurality of separate signaling sets with regard to similarities and dissimilarities between at least two of the plurality of the signaling sets for classifying each signaling set into at least one class of signaling sets in accordance with a result of the analysis, wherein the analyzing comprises transforming trace data representing a respective one of the plurality of signaling sets for generating a signaling set sequence according to a sequence model by filtering predetermined information from the trace data, evaluating a distance of signaling sets by using respective signaling set sequences, wherein the distance is indicated by a distance metric, and assigning the respective signaling set to a signaling set class on the basis of the distance metric.

18 Claims, 16 Drawing Sheets

(51) Int. Cl.
*H04L 12/24* (2006.01)
*H04W 84/04* (2009.01)

(58) Field of Classification Search
USPC .............................. 455/423, 424, 446, 67.11
See application file for complete search history.

(56) References Cited

U.S. PATENT DOCUMENTS

| | | | |
|---|---|---|---|
| 9,071,677 B2* | 6/2015 | Aggarwal | H04M 3/2227 |
| 9,503,570 B2* | 11/2016 | Aggarwal | H04M 3/2227 |
| 9,798,596 B2* | 10/2017 | Vibhor | G06F 11/0709 |
| 2006/0040711 A1* | 2/2006 | Whistler | H04W 24/00 |
| | | | 455/566 |
| 2007/0201388 A1* | 8/2007 | Shah | H04L 5/0046 |
| | | | 370/300 |
| 2007/0243864 A1 | 10/2007 | Jaquet | |
| 2008/0248795 A1 | 10/2008 | Petersen et al. | |
| 2010/0135470 A1 | 6/2010 | Bishop | |
| 2014/0226799 A1 | 8/2014 | Aggarwal | |
| 2014/0226800 A1* | 8/2014 | Aggarwal | H04M 3/2227 |
| | | | 379/32.01 |
| 2014/0229614 A1* | 8/2014 | Aggarwal | H04M 3/2227 |
| | | | 709/224 |
| 2014/0270114 A1 | 9/2014 | Kolbegger et al. | |

\* cited by examiner

ANALYZING AND CLASSIFYING SIGNALING SETS OR CALLS

BACKGROUND

Field

The present invention relates to apparatuses, methods, systems, computer programs, computer program products and computer-readable media usable for analyzing and classifying signaling sets like calls or the like.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partnership Project
AP: access point
BGW: border gateway
BS: base station
CPU: central processing unit
DHD: dynamic Hamming distance
DL: downlink
DSP: digital signal processor
IP: Internet protocol
LTE: Long Term Evolution
LTE-A: LTE Advanced
MGW: media gateway
MSS: mobile switching center
RAN: radio access network
RLC: radio link control
RNC: radio network controller
RRC: radio resource control
SDU: service data unit
SIP: session initiation protocol
SON: self-organizing network
TAS: telephony application server
TCP: transmission control protocol
UE: user equipment
UL: uplink
UP: user plane
VNF: virtual network function
VoIP: voice over IP
VoLTE: voice over LTE
WCDMA: wideband code division multiple access Embodiments of the present invention are related to networks including a communication system in which a procedure can be implemented for analyzing and classifying signaling sets, such as calls, data communications and the like.

SUMMARY

According to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to analyze a plurality of separate signaling sets with regard to similarities and dissimilarities between at least two of the plurality of the signaling sets for classifying each signaling set into at least one class of signaling sets in accordance with a result of the analysis, wherein the analyzing comprises transforming trace data representing a respective one of the plurality of signaling sets for generating a signaling set sequence according to a sequence model by filtering predetermined information from the trace data, evaluating a distance of signaling sets by using respective signaling set sequences, wherein the distance is indicated by a distance metric, and assigning the respective signaling set to a signaling set class on the basis of the distance metric.

Furthermore, according to an example of an embodiment, there is provided, for example, a method comprising analyzing a plurality of separate signaling sets with regard to similarities and dissimilarities between at least two of the plurality of the signaling sets for classifying each signaling set into at least one class of signaling sets in accordance with a result of the analysis, wherein the analyzing comprises transforming trace data representing a respective one of the plurality of signaling sets for generating a signaling set sequence according to a sequence model by filtering predetermined information from the trace data, evaluating a distance of signaling sets by using respective signaling set sequences, wherein the distance is indicated by a distance metric, and assigning the respective signaling set to a signaling set class on the basis of the distance metric.

Moreover, according to an example of an embodiment, there is provided, for example, a computer program product, comprising a computer usable medium having a computer readable program code embodied therein, the computer readable program code adapted to execute a process comprising analyzing a plurality of separate signaling sets with regard to similarities and dissimilarities between at least two of the plurality of the signaling sets for classifying each signaling set into at least one class of signaling sets in accordance with a result of the analysis, wherein the analyzing comprises transforming trace data representing a respective one of the plurality of signaling sets for generating a signaling set sequence according to a sequence model by filtering predetermined information from the trace data, evaluating a distance of signaling sets by using respective signaling set sequences, wherein the distance is indicated by a distance metric, and assigning the respective signaling set to a signaling set class on the basis of the distance metric.

According to further refinements, these examples may include one or more of the following features:
- each signaling set may be a result of a signaling between a plurality of network elements or functions or within a network element or function, the signaling comprising a series of messages or context data in at least one of a data communication, a voice communication, a message exchange between software blocks involving one or more network elements or functions and protocol stacks, and the trace data may comprise information about at least one of individual events and messages of the signaling set, user plane events, status change events, update events, failure counter events, and properties related to events or messages;
- a signaling set sequence being generated according to a sequence model may comprise an ordered list of sequence elements representing a relevant part of the trace data, wherein the sequence elements may be selected from a plurality of types of sequence elements, each type being differentiated and assigned to a unique identifier, wherein the sequence element may comprise at least one of a scalar identifier and an information element derived from the trace data;

the plurality of separate signaling sets may be preselected for analyzing in accordance with a type of failure indication comprised in the signaling sets;

for transforming the trace data representing a respective one of the plurality of signaling sets for generating the signaling set sequence according to a sequence model, parts of the trace data for identifying specific elements may be differentiated, a corresponding identifier may be assigned to each specific element, and the signaling set sequence may be generated by using the assigned identifiers;

for transforming the trace data representing a respective one of the plurality of signaling sets for generating the signaling set sequence according to a sequence model, the filtering of the predetermined information from the trace data may be adapted to a processing conducted for evaluating the distance of signaling sets, wherein results of the transforming of the respective trace data may correspond to a common sequence model being suitable for the processing conducted for evaluating the distance of signaling sets;

for evaluating the distance of the signaling sets, a distance of at least two signaling set sequences derived from the plurality of signaling sets to each other or a distance of signaling set sequences derived from the plurality of signaling sets to at least one pre-stored reference sequence set may be computed, wherein the distance metric may be determined by aligning the signaling set sequences under consideration of a specific element in each signaling set sequence, wherein the specific element in each signaling set sequence may be related to one of a failure event in the trace data, a first element of the signaling set sequence, and a last element of the signaling set sequence;

as the distance metric, one of a Dynamic Hamming Distance, a Levenshtein distance and a Jaccard distance may be determined, and a result of the distance metric determination may be modulated with a weighting factor function being dependent on a distance between a position in the signaling set sequence to the specific element used for alignment;

the distance metric may be considered for assigning signaling sets which fulfill a predetermined similarity condition with each other to the same signaling set class and for assigning signaling sets which do not fulfill the predetermined similarity condition with each other to another signaling set class;

a plurality of separate signaling sets may be analyzed in one of an off-line mode and an on-line mode, wherein in the off-line mode, the plurality of signaling sets may be a closed set of previously stored signaling sets, and in the on-line mode, the plurality of signaling sets may be input in a subsequent manner and the analyzing may be conducted in accordance with an arrival of signaling sets for an arbitrary time period;

in the off-line mode, at least one of the signaling set classes may be used as a reference signaling set class defining a signaling set sequence to be used in a distance evaluation in a signaling set analysis in at least one of the off-line mode and the on-line mode;

in the off-line mode, the distance of the signaling sets may be evaluated by aligning the signaling set sequences to a specific element of the signaling set sequences corresponding to a failure counter incrementing event in the trace data, pairwise distances of the signaling set sequences may be computed as a distance matrix according to the distance metric, and, for assigning the signaling sets to a signaling set class, a partitioning or clustering processing may be used for identifying subsets of signaling set sequences with a distance being equal to or lower than a predetermined distance by using the distance matrix;

in the on-line mode, at least one reference signaling set class each comprising at least one reference signaling set sequence may be used for evaluating a distance of a signaling sets and for assigning the signaling sets to a signaling set class, and, in case a signaling set is not assignable according to any reference signaling set class, a new reference signaling set class may be defined on the basis of the not assignable signaling set;

in the on-line mode, the distance of the signaling sets may be evaluated by aligning the signaling set sequences to a reference signaling set sequence, pairwise distances of the signaling set sequence and the reference signaling set sequence may be computed as a distance vector according to the distance metric, and on the basis of the distance vector it may be determined whether the signaling set is to be assigned to a signaling set class being the closest signaling set class or defines a new signaling set class;

results of the analysis of the signaling sets may be provided for a post-processing related to changes in analysis results over the time;

the above processing may be implemented in a network element or function configured to act as a network control element or function or to act as an analysis element or function, wherein the network may be communication network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
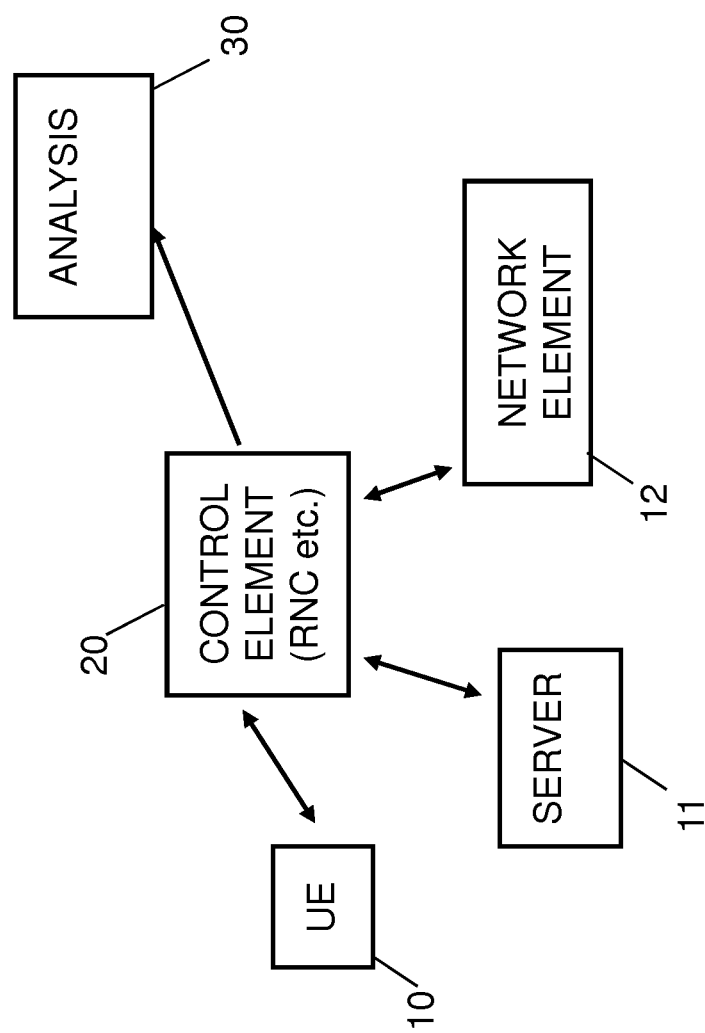
FIG. 1 shows a diagram illustrating a general architecture of a network including a communication system where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), fourth generation (4G) communication networks or enhanced communication networks based e.g. on LTE or LTE-A, fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Embodiments as well as principles described below are applicable in connection with any network element included in a communication network environment, such as a terminal device, a network element, a relay node, a server, a node, a corresponding component, and/or any other element of a communication system or any combination of different communication systems that support required functionalities. The communication systems may be any one or any combination of a fixed communication system, a wireless communication system or a communication system utilizing both fixed networks and wireless networks. The protocols used, the specifications of communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an communication network to which the embodiments may be applied, a radio access architecture based on 3GPP standards, such as a third generation or fourth generation (like LTE or LTE-A) communication network, without restricting the embodiments to such architectures, however. It is obvious for a person skilled in the art that the embodiments may also be applied to other kinds of communication networks having suitable means by adjusting parameters and procedures appropriately, e.g. WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), etc.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a network including a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point (AP) or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein.

However, it is to be noted that several additional network elements and signaling links may be employed for a communication to or from an element, function or application, like a communication element, such as a UE, a communication network control element, such as an server, a radio network controller, and other elements of the same or other communication networks besides those described in detail herein below.

A network considered in examples of embodiments may also be able to communicate with other networks, such as a public switched telephone network or the Internet. The communication network may also be able to support the usage of cloud services. It should be appreciated that network elements of an access system, of a core network etc., and/or respective functionalities may be implemented by using any node, host, server, access node or entity etc. being suitable for such a usage.

Furthermore, the described network elements, such as communication elements, like a UE, access network elements, like a radio network controller, other network elements, like a server, an analyzing entity etc., as well as corresponding functions as described herein, and other elements, functions or applications may be implemented by software, e.g. by a computer program product for a computer, and/or by hardware. For executing their respective functions, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network control element, a network function, or of another entity of the network, may be performed in different entities or functions, such as in a node, host or server, in a flexible manner. In other words, a "division of labor" between involved network elements, functions or entities may vary case by case.

With regard to FIG. 1, a diagram illustrating a general architecture of a network including a communication system is shown where some examples of embodiments are implementable. It is to be noted that the structure indicated in FIG. 1 shows only those devices, network elements and links which are useful for understanding principles underlying some examples of embodiments of the invention. As also known by those skilled in the art there may be several other network elements or devices involved in a communication in the communication system which are omitted here for the sake of simplicity.

In FIG. 1, a network comprising a communication system is shown which forms a general basis of a communication system according to some examples of embodiments. Specifically, a (wireless) communication network based for example on a 3GPP specification is provided. It is to be noted that both the number of network elements as well as the type thereof as depicted in FIG. 1 are merely intended to provide a basis for illustrating the principles of the analyzing and classifying processing according to some examples of embodiments.

According to FIG. 1, reference signs 10, 11 and 12 denote a respective communication element, such as a UE, a server, another network element like an access network control element or a core network control element, which represents one end point of a communication forming a signaling set to be analyzed (as described above). For example, when taking the UE 10 as an example, UL data packets and signaling are transmitted from the UE towards the network and DL data packets and signaling are received by the UE 10 from the network.

Reference sign 20 denotes a network control element, such as radio network controller of an access network with which the UE 10 communicates. The network control element 20 represents the other end point of a communication forming a signaling set to be analyzed. It is to be noted that the network control element 20 may be any network element or function which is suitable to conduct a communication or signaling exchange with any one of the other end points denoted by reference signs 10, 11 and 12, for example, such as another server, another UE etc.

As a matter of course, the number of communication end points, such as of elements 10, 11 and 12 and/or of control element 20 is not limited to the number of elements indicated in FIG. 1. According to some examples of embodiments, the number of elements and hence the number of signaling sets to be analyzed may be variable in comparison to FIG. 1, which is used only as an illustrative example in this regard.

Reference sign 30 denotes an entity or function which is configured to analyze and classify signaling sets exchanged in the network, such as between any of elements 10, 11, 12, and 20. The analysis element or function 30 may be a standalone element or function, running e.g. in a dedicated device or system, or implemented in one or more other elements of a network, such as in the control element 20, or another network element, e.g. a MSS, a TAS, a MGW, a BGW or the like. For executing its functionality, the signaling sets to be analyzed are provided to the analysis element or function from the network in a suitable form, which will be discussed below. For example, according to some examples of embodiments, the signaling sets are provided by the control element 20, but examples of embodiments are not limited to this.

One problem in networks where data are communicated between network elements or functions is that there is always the possibility of communication failures. Quick troubleshooting of network side failures (which may be indicated by alarms, failure counters, etc.) and an accurate root cause analysis are thus important to sustain low failure rate and high service quality in networks.

For example, in a communication network like that shown in FIG. 1, calls may fail, and it may be difficult to troubleshoot such failed calls. Reasons are, for example, that the overall call amount is huge, call cases may be complex, many different network elements may be participated to call, a data amount being communicated may be huge, and the like.

It is known that a particular event or messaging sequence in a network may cause problems leading to a failure. For example, a codec or user plane initiation after handover may fail and a call is muted or fails with user plane timeout.

Therefore, an analysis of call failure reasons is an important measure for ensuring quality of service/quality of experience.

However, corresponding workflows currently involve multiple tedious steps that often require human intervention and manual investigation of the failure cases one-by-one. Therefore, achieving a certain level of automation in the failure analysis and classification processes is desirable, since it is possible to both save manual resources and increase accuracy.

One possible application field where troubleshooting automation can be useful is the classification of failed signaling sets, such as calls. The setup of a call (e.g., voice or data bearer) and its progress after establishment may be fully successful (from both control plane and user plane point of view) or it exhibits a fatal and/or one or more non-fatal failures during its lifetime. Each failure (both fatal and non-fatal) may be indicated with a specific error code. Calls with failures are usually indicated to the network management system by incrementing one or more counters corresponding to error code(s), which is also referred to as failure counters. When a failure happens, then this event triggers incrementing a corresponding failure counter, for example.

Currently, failure counters provide the only categorization of failed calls. Therefore, all calls with the same failure counter are either assumed to have the same underlying problem (which is not necessarily true) or they have to undergo tedious manual investigation. In the former case, incorrect conclusions and actions may be triggered, whereas in the latter case most of the calls remain unanalyzed as manual troubleshooting is not scalable and cannot cover all calls with any kind of failure.

Thus, as a basic problem solved by embodiments of the invention, an (additional) automated classification or analysis is to be provided which allows a deeper insight into the root cause of the failures or to recognize similarities or dissimilarities within the call's internal structure that would enable a more granular classification.

In other words, according to some examples of embodiments of the invention, measures are provided allowing to classify signaling sets such as calls on the basis of their internal structure (which is also referred to as trace data or call trace, as defined below) instead of, or in addition to, relying on one or more of the pre-defined failure counters assigned to the call by the communication system. The failure counters are limited to the granularity and scope of their definition programmed into the system (similarly to alarms) and they convey a singularity of information about the occurrence of a failure event without any additional context on what were the steps and circumstances leading to the failure. Even in case of the same failure (i.e., same failure counter), the context of the failure (e.g., the sequence of messages leading to the failure event, or the messages after the failure) may be significantly different, indicating non-uniform scenarios that require alternative corrective actions or should be differentiated at least for reporting. Additionally, the pre-defined nature of the failure counters does not allow the automatic discovery of outliers, i.e. calls that significantly differ from all previously known failure cases. Consequently, these calls may be assigned a wrong or at least too general failure counter (lacking a more specific one to indicate the particular problem) or may not be assigned a failure counter at all (in case there is no trap in the software components facilitating the call to handle the specific failure), creating a false impression of a successful call. These inaccuracies remain in the system until such calls become subject of manual investigation, which may not happen at all or may happen only after many of such calls have already passed undetected or the particular problem is causing serious degradations.

Consequently, examples of embodiments of the invention are related to an automated analysis that is able to classify failed signaling sets or calls also beyond current failure counters.

In this context, it is to be noted that the analysis and classification may be applied to any suitable signaling set. One example of such a signaling set, which is used in the following as an equivalent for the term, is a call, but "signaling set" is to be understood in a wider scope and describes any procedure (usually a sequence of protocol messages) performed in a computer or communication network that creates an arbitrary context between or within network entities or functions. In this sense a signaling set or call can be generalized to refer to various types of communications, such as a TCP connection, a (complex) voice call procedure in a telecommunication network that involves multiple network entities and protocol stacks, a proprietary message sequence between software blocks, as well as any suitable parts of such procedures.

Furthermore, it is to be noted that examples of embodiments of the invention can be applied to an analysis of signaling sets or calls within any communication network, including 3GPP 2G, 3G or LTE and beyond radio access networks, IP networks, end-to-end call establishment procedures such as SIP, VoIP, VoLTE, or any other signaling set where e.g. error indications or other explicit categorization is provided and can be represented by a trace data.

According to examples of embodiments of the invention, an analysis and classification of signaling sets such as calls is based on structural similarities and differences of the calls. According to examples of embodiments, signaling sets such as calls can be represented by so-called trace data or call traces which collect individual events and messages such as signaling during the call (e.g., internally within a network element or exchanged via a communication connection, e.g. on a layer 3 in 3GPP based networks), user plane events (e.g., sending/receiving data) or status changes/updates within a network element. According to further examples of embodiments, each event or message in call traces or trace date may be supplemented by a set of properties, such as time, sender and/or receiver identity, attributes, etc. Furthermore, according to some examples of embodiments, failure counters themselves are also part of the trace data or call trace. In this context, it is to be noted that in case of a fatal failure, the failure counter may be the last element of the call trace, whereas in case of non-fatal failures the call trace may continue after a failure counter with additional messages or events. Furthermore, according to some examples of embodiments, a self-learning ability is provided for the analysis and classification element or function which allows to adjust a processing (e.g. an algorithm on which the processing is based) to conditions of a network from which signaling sets or calls are provided for analysis.

Examples of embodiments are applicable in various places in the network. As indicated above, a network control element or function or an analysis element or function is usable for implementing the signaling set analysis and classification procedure, but other examples of embodiments may be implemented in connection with any equipment or function used for processing or handling a control part in a network.

Examples of embodiments are related to a signaling set classification (in the following a signaling set will be referred to as a call) in which call traces are autonomously analyzed so as to find structural similarities (and dissimilarities) among calls. For example, calls are considered in the analysis that increment the same failure counter or have no failure counter at all, i.e. would be treated uniformly by existing network management or troubleshooting systems. The classification is defined so that calls with traces similar enough are assigned to the same class.

As indicated above, failure counters differentiate explicitly among known failure cases. Therefore, according to some examples of embodiments, one use case of the analysis and classification procedures according to some examples of embodiments is to further categorize calls that increment the same failure counter, thereby automatically finding different root causes and failure scenarios where originally there is only a single type of failure indication. Another use case of the analysis and classification procedures according to some examples of embodiments is to identify calls that have no failure counters (thus being considered successful) but still show high structural similarity to known failed calls (that do have failure counters). This can proactively unveil soft (i.e. non-fatal) failures in the system that would otherwise remain hidden.

Figure 2:
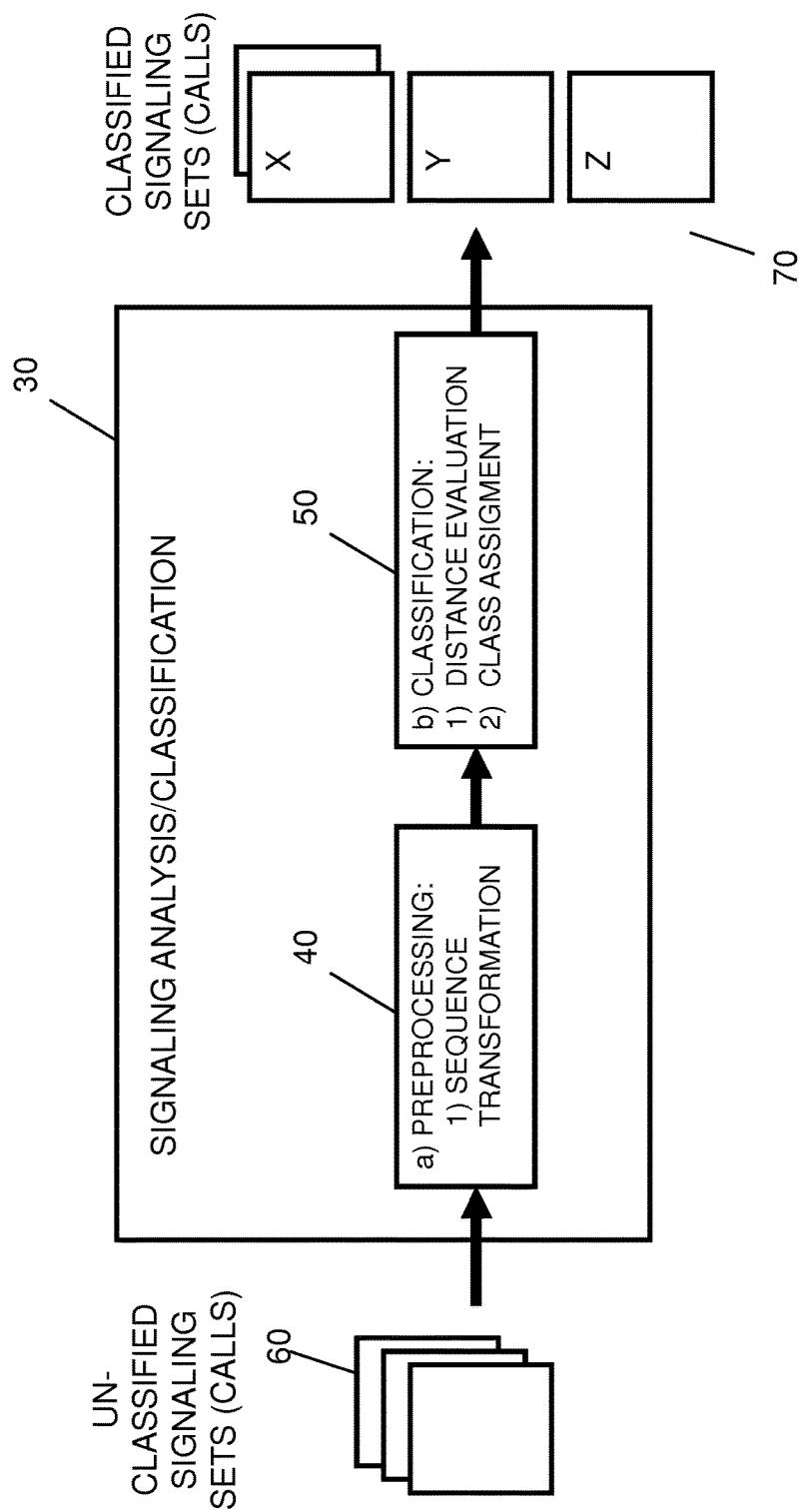
FIG. 2 shows a diagram illustrating an element or function usable for analyzing and classifying signaling sets according to some examples of embodiments.

FIG. 2 shows a diagram illustrating an element or function usable for analyzing and classifying signaling sets according to some examples of embodiments. Basically, FIG. 2 illustrates the basic concept of an analysis element or function 30 as depicted in FIG. 1 and describes the main workflow of the analysis and classification procedures according to examples of embodiments.

As indicated in FIG. 2, there are two portions forming the analysis and classification flow, i.e. a preprocessing part 40, which prepares input data, such as signaling sets or calls (represented by trace data or call traces 60) being unclassified so far, by means of executing a sequence transformation, and a classification part 50 involving a distance evaluation and a class assignment, so as to perform the actual classification. A result of the analysis and classification processing conducted in the parts 40 and 50 is a classification of the unclassified signaling sets (calls) 60 into classified signaling sets (calls) 70, wherein X, Y, and Z represent different signaling set classes or call classes for the calls.

For example, in the preprocessing part 40, a sequence transformation is executed. For this purpose, first the trace data or call traces 70 representing the individual signaling sets (calls) are filtered so that only those elements of the traces are kept which are relevant for the classification (i.e. relevant for the distance evaluation step particularly, as described below). The elements passing the filter are referred to as signaling set sequence, i.e. a sequence model representation of the call. The further parts in the call analysis and classification processing work in the space of sequence models.

It is to be noted that according to examples of embodiments, an implementation of the sequence transformation may depend on a deployment environment of the procedure. That is, according to some examples of embodiments, call traces of arbitrary format and structure can be converted into a common sequence model representation, which is itself specific to the deployment environment. Thus, a further processing in the further parts, i.e. the distance evaluation and class assignment, can be supported, e.g. by adapting the sequences to algorithms used in subsequent steps, regardless of the original trace format and structure.

In the classification part 50, according to examples of embodiments, when evaluating the distances of the calls to each other, the distances of the analyzed sequences are computed either pair-wise among each other or between the analyzed sequences and members of a reference sequence set (i.e., a set of sequences that have already been classified in a previous run). For example, according to some examples of embodiments, distance computation is based on a metric that defines the distance of two calls given by their sequence model. It is to be noted that various distance metric types can be used by different implementations of the analysis and classification procedures according to some examples of embodiments. Basically, the objective of the distance metric is to show two calls as similar ones (i.e. having a low distance) in case the root cause of their failure is likely the same. Therefore, according to some examples of embodiments, the distance metric may prioritize (dis)similarities in the call structure in the vicinity of a specific point, e.g. a failure counter event, and consider parts further away from the specific point as having less impact on the distance.

Furthermore, in the classification part, according to some examples of embodiments, a class assignment is executed. That is, based on the results of the distance evaluation, the analyzed sequences are assigned to one or more classes. The objective of the class assignment is to maintain high similarity (according to the distance metric) within calls mapped to the same class and low similarity between calls mapped to different classes.

Figure 3:
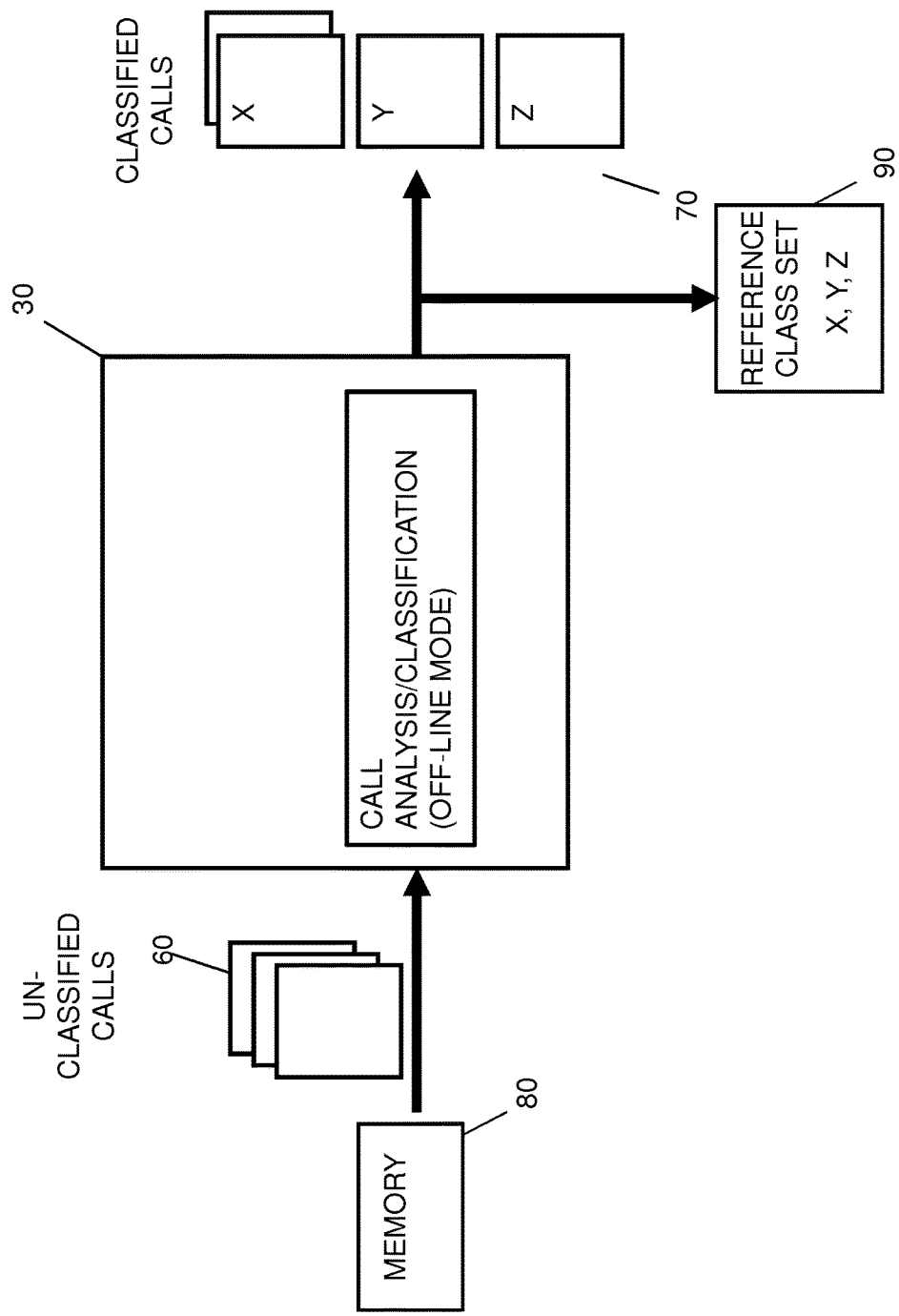
FIG. 3 shows a diagram illustrating an element or function usable for analyzing and classifying signaling sets according to some examples of embodiments.
Figure 4:
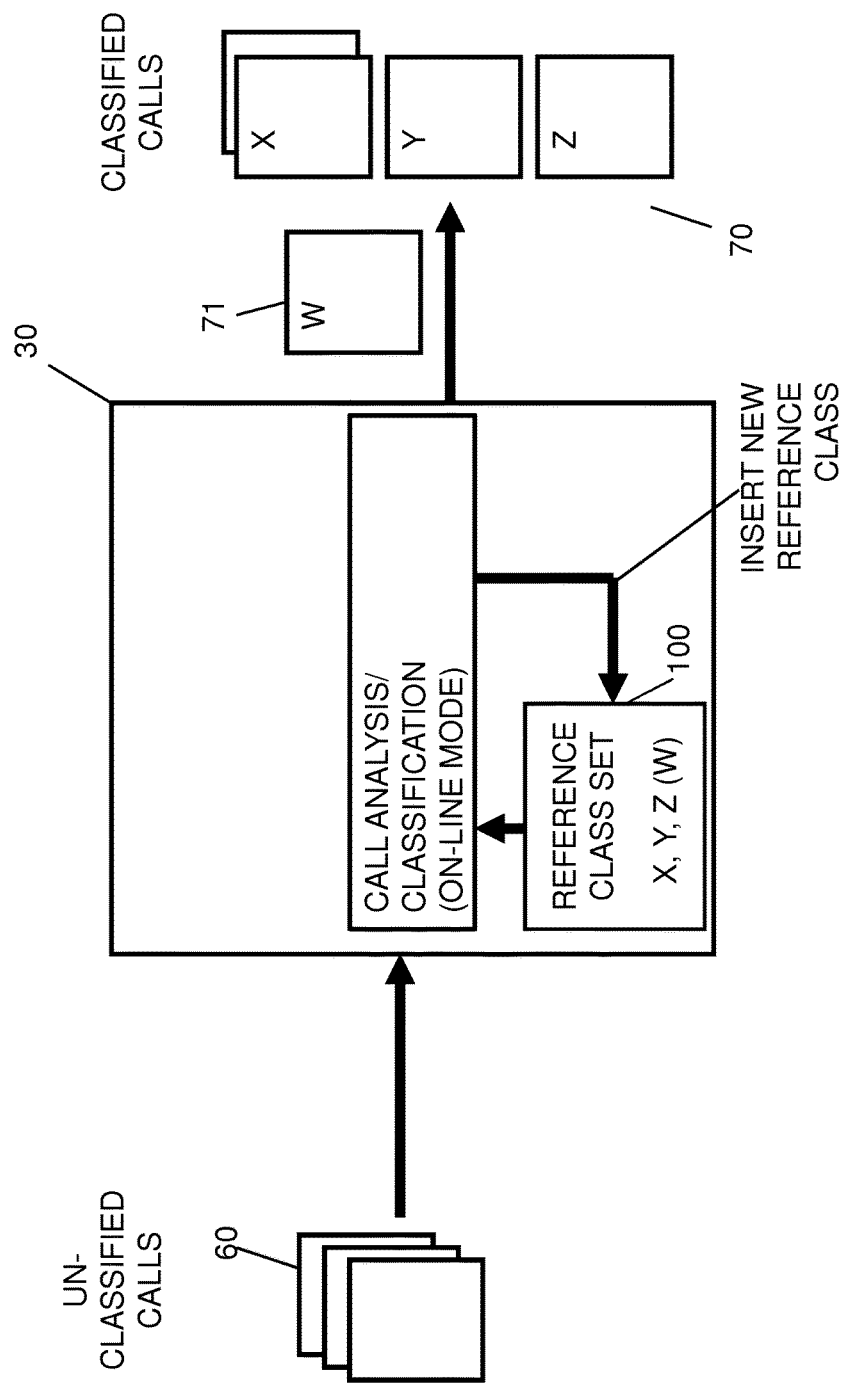
FIG. 4 shows a diagram illustrating an element or function usable for analyzing and classifying signaling sets according to some examples of embodiments.

FIGS. 3 and 4 show diagrams illustrating an element or function usable for analyzing and classifying signaling sets according to some examples of embodiments. Specifically, FIGS. 3 and 4 illustrate different operation modes usable for the analysis and classification procedures according to some examples of embodiments. It is to be noted that the parts and functions indicated in each of FIG. 3 and FIG. 4 are in correspondence with the general structure of the analysis and classification mechanism according to FIG. 2 so that the same reference signs are used for equivalent parts.

In detail, in FIG. 3, an off-line mode is depicted in which the analysis of calls is conducted with regard to a closed set of calls. According to some examples of embodiments, this closed set of calls is available in the beginning of the analysis, and during the analysis no additional calls are to be considered. For example, the closed set of calls (i.e. of trace data or call traces 60 representing the calls) is stored in a memory 80 or the like used as a call storage from which the closed set of calls is transferred to the analysis element of function 30, for example.

As the off-line operation has access to all of the calls to be analyzed at once, according to some examples of embodiments, it is possible to execute a full comparison (i.e., distance calculation) between any two of the calls to perform the classification.

According to some examples of embodiments, the result of an off-line classification (i.e. the set of calls and their respective classes) is usable as a reference class set 90. In FIG. 3, it is assumed that the reference class set comprises the classes X, Y and Z, for example. The reference class set 90 is used, for example, for a next off-line run (in order to provide a more extensive classification basis) or as a comparison basis for an on-line operation (see below).

On the other hand, in FIG. 4, an on-line mode is depicted in which the analysis of calls is conducted in a continuous operation. That is, according to some examples of embodiments, calls represent by call traces 60 may arrive at any time and for an arbitrary time period (i.e. a finite or infinite time period). That is, in contrast to the off-line mode indicated in FIG. 3, there is no closed set of calls in the on-line mode, which could be considered by the analysis as a final call population. Hence, the analysis and classification procedures conduct the analysis at each call upon its arrival and produces a classification (e.g. in real time) or accumulate multiple calls to have statistically relevant amount of data to perform a suitable classification.

According to some examples of embodiments, in the on-line mode, the classification processing considers calls that are already analyzed in a preceding on-line mode processing, or calls in a reference class set 100. The reference class set may be created by an off-line analysis, for example, i.e. may correspond to the reference class set 90. On the other hand, in case calls are analyzed which are significantly different from any of the previously analyzed calls, a new call class 71 (call class W in FIG. 4) is defined autonomously, wherein according to some examples of embodiments this new call class is inserted in the reference class set 100 for further analysis cycles.

That is, according to examples of embodiments, it is possible to conduct a signaling set or call classification beyond failure counters, wherein it is possible to automatically create sub-classes of calls that are significantly different despite incrementing e.g. the same failure counter(s). As calls in the same sub-class are likely to have the same underlying problem that caused the failure counters to be incremented, an improved analysis is achievable.

Furthermore, according to examples of embodiments, problematic calls (e.g. calls with non-fatal problems) can be identified even though there is no indication such as a failure counter increment (i.e., calls which are originally classified as being successful) which nevertheless show similarity with known failure cases (which in turn could be indicated, for example, in a post processing procedure). Due to this, it is possible to provide an early warning by predicting problems before they escalate into more serious hard failures.

Moreover, according to examples of embodiments, a call classification being independent of failure counters or the like is possible. That is, it is possible to detect similarity between calls that increment different failure counters. Thus, groups of calls can be created which increment different failure counters but have a structural similarity in call sequences which in turn indicates that these calls suffered effects of the same underlying problem. Hence a link between different failure events can be grasped.

In addition, according to examples of embodiments, new types of failures can be recognized by detecting that the same failure counter is incremented by calls with previously unknown structure. For example, as a post processing, such a detection result can be channelized back to a failure counter definition entity or to an operator so that a dedicated counter can be created to give explicit visibility to the underlying problem later on.

Furthermore, according to examples of embodiments, verification of changes (triggered by e.g. SON, configuration, optimization, etc.) can be supported by automatically detecting the change of call patterns after such an event.

In the following, illustrative examples are described showing implementations of a call trace classification procedure according to examples of embodiments when applied to the diagnosis of calls (e.g. voice calls or data bearers) established in a mobile communication network such as one being based on GSM, 3G/UMTS or LTE.

Figure 5:
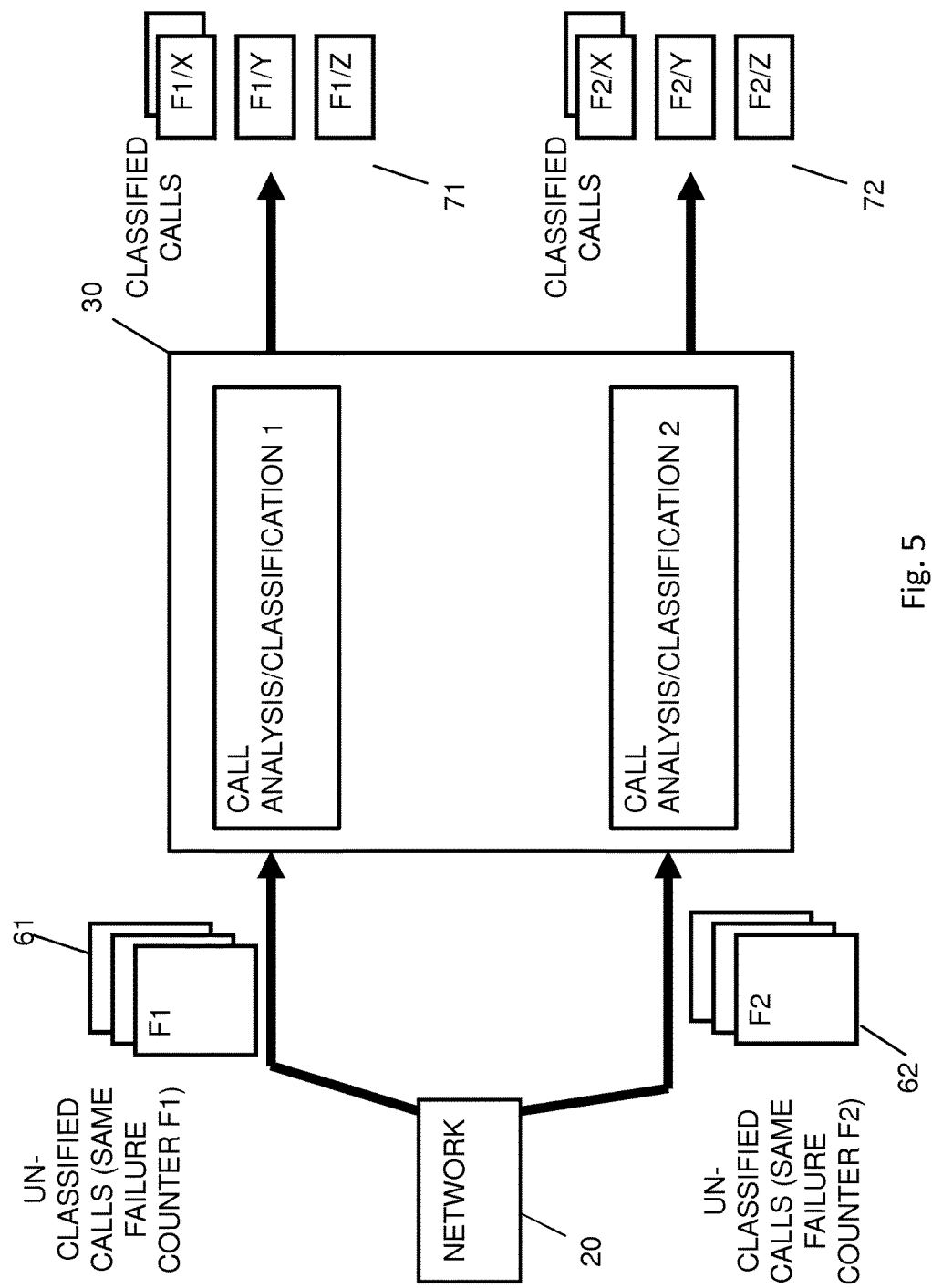
FIG. 5 shows a diagram illustrating an element or function usable for analyzing and classifying signaling sets according to some examples of embodiments.

FIG. 5 shows a diagram illustrating an element or function usable for analyzing and classifying signaling sets according to some examples of embodiments wherein it is assumed that in the communication network calls are pre-classified by a specific failure counter. In other words, it is assumed that there are calls in which the same failure counter or set of failure counters is incremented.

It is to be noted that in the example indicated in FIG. 5, two failure events represented by failure counters F1 and F2 are assumed, but it is obvious that the number of different failure events and thus failure counters it not limited to two.

According to the example shown in FIG. 5, the network, i.e. an entity collecting call traces, such as a network control element 20 in FIG. 1 (e.g. an RNC), directs the call traces related to respective calls identified to have the same failure (due to the presence of a failure counter event F1 and F2, respectively) to a dedicated call analysis/classification process 1 or 2 in one or more analysis elements 30 (in FIG. 5, one analysis element 30 is assumed to combine each call analysis/classification function 1 and 2, but the respective call analysis/classification functions can be also distributed over more than one analysis element 30). That is, a filtering of calls based on the incremented failure counter is executed. For example, call traces 61 having incremented the same failure counter F1 are directed to the call analysis/classification entity 1, while call traces 62 having incremented the same failure counter F2 are directed to the call analysis/classification entity 2.

The call analysis/classification entities 1 and 2 conduct a call classification procedure according to examples of embodiments. As a result of the call classification procedure, the call analysis/classification entity 1 outputs a set of classified calls comprising, besides the failure counter classification level, a further classification assigned by the call classification procedure according to examples of embodiments (such as X, Y, Z).

In the following, implementations of examples of embodiments are discussed so as to show further details of the operation of the call classification procedure when it is applied to classify sets of calls incrementing the same failure counter. For example, one of the processing branches in FIG. 5 is examined in respective processing modes for a call classification procedure according to some examples of embodiments. That is, the captured call traces are assumed to be first separated into disjoint sets, where each set consists of calls incrementing a specific counter (e.g. failure counter F1). Next, each set is processed by a dedicated call analysis/classification entity (e.g. call analysis/classification entity 1) where the classification of calls within the associated call trace set is performed in either one of the off-line mode or on-line mode.

Error! Reference source not found. Specifically, in FIG. 6, a workflow of the off-line mode of the call classification procedure according to examples of embodiments is shown.

As described above, the workflow of the call classification procedure comprises three main parts, i.e. a sequence transformation part 40 representing the preprocessing instance, a distance evaluation part 51 and a class assignment part 52, which represent the classification instance. Un-classified calls (call traces or trace data) 61 are input and processed in the sequence transformation part 40, wherein resulting call sequences are then delivered to the distance evaluation part 51. In the distance evaluation part, a processing according to the off-line mode is conducted, for example by aligning the sequences to a specific point or element in the sequences (for example the failure counter event in the sequences) as a reference point, and by computing pairwise distances of the analyzed sequences as a distance matrix according to a selected distance metric. The distance matrix is then delivered to the calls assignment part 52, where a partitioning or clustering processing is conducted in order to identify low distance subsets of sequences (e.g. on the basis of a comparison with a threshold) by using the distance matrix. The result of the processing, i.e. the classified calls 70 are then output.

Figure 6:
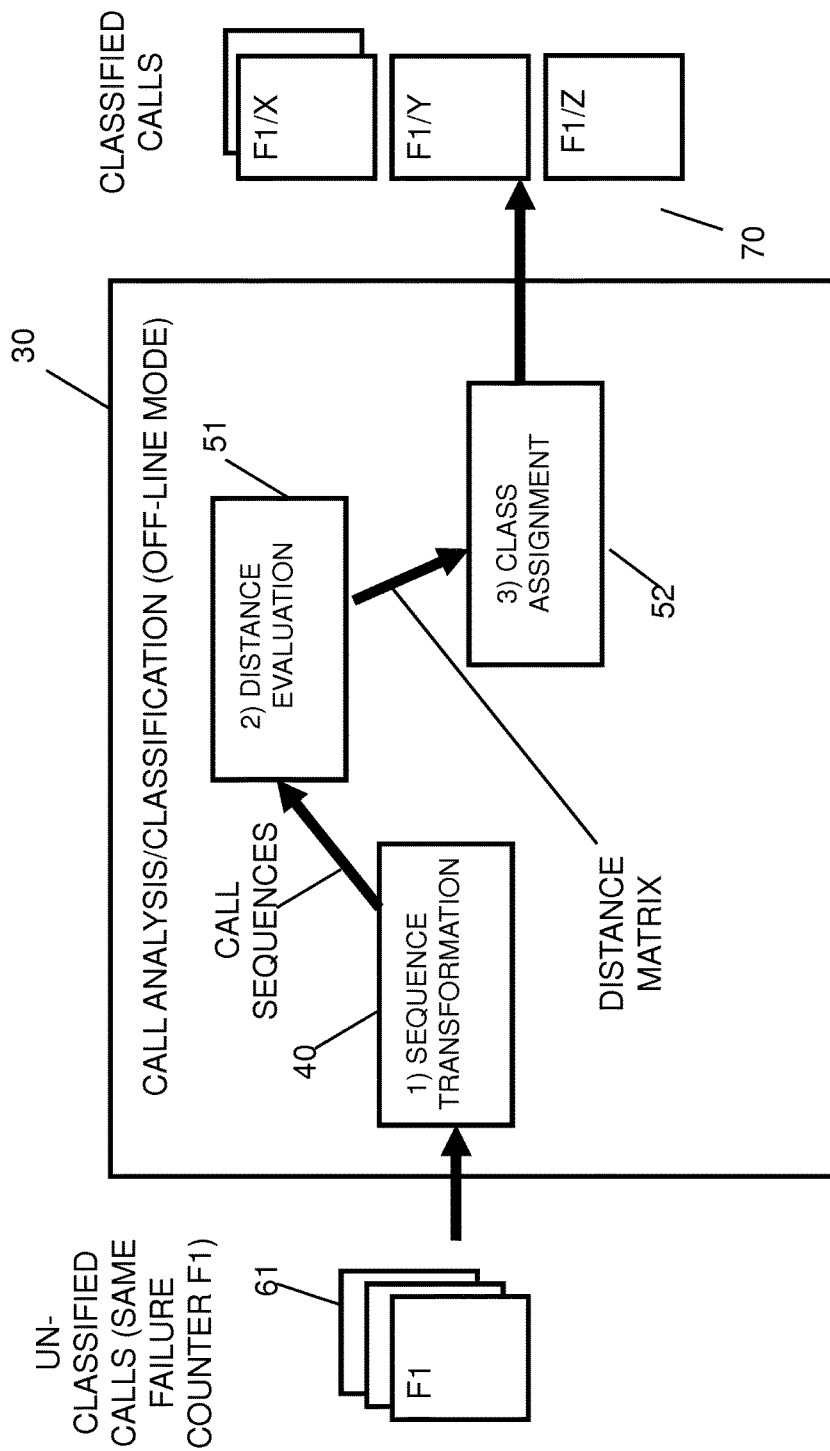
FIG. 6 shows a diagram illustrating an element or function usable for analyzing and classifying signaling sets according to some examples of embodiments.

In the following, details of the processing conducted by each of the sequence transformation part 40, the distance evaluation part 51 and the class assignment part 52 in the off-line mode processing indicated in FIG. 6 are described according to examples of embodiments.

Figure 7:
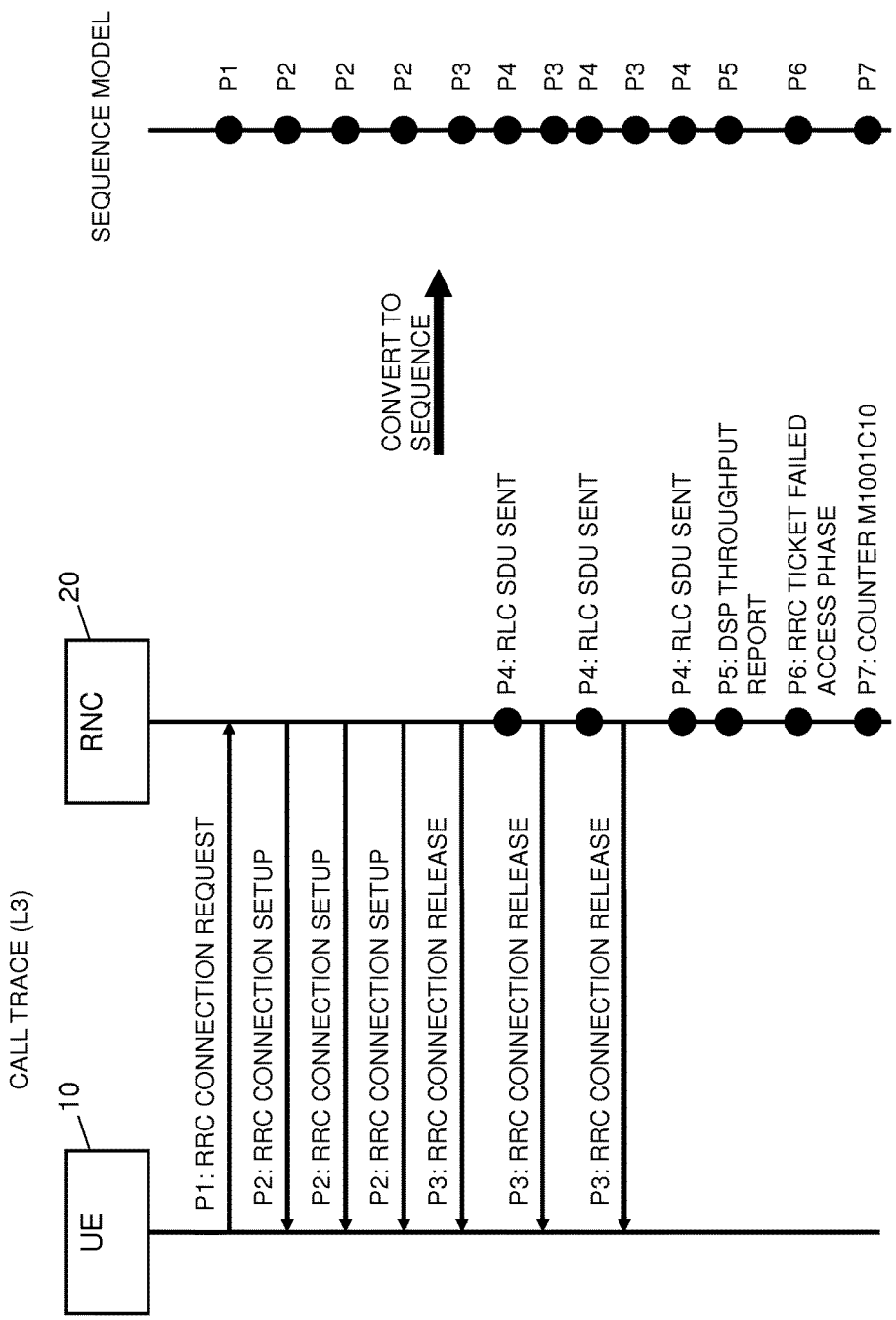
FIG. 7 shows a diagram illustrating an example of a conversion of trace data representing a call into a sequence model according to some examples of embodiments.

In FIG. 7, a diagram is shown which illustrates an example of a conversion of trace data representing a call into a signaling set sequence or call sequence according to a sequence model in accordance with some examples of embodiments. The conversion processing indicated in FIG. 7 corresponds to a possible processing of the sequence transformation part 40.

Basically, the processing of sequence transformation which is conducted e.g. in the sequence transformation part 40 is related to a preparation of potentially complex input call traces into a (simplified) sequence model representation, which can be processed by a procedure based, for example, on predetermined algorithms used in subsequent processing blocks of FIG. 6, for example. It is to be noted that the described conversion processing is only one possible example for a synthesis of call sequences.

As an elementary input of the sequence transformation processing, trace data or a call trace that corresponds to a specific call performed in the system are provided by the network. The goal of the sequence transformation is to remove those parts of the call traces that are not relevant for the distance evaluation (which follows in a next processing phase). Consequently, the sequence transformation processing is specific to an applied distance evaluation processing of which also various alternatives may be implemented.

According to some examples of embodiments, the sequence model used for a call sequence generation from trace data or call traces of a call is an ordered list of so-called sequence elements each of which represents, for example, one or more messages (e.g. exchanged between physical or logical entities) or events (occurring within these entities), which were identified within the call trace. A sequence element carries information about the associated part of the call trace that is relevant for the distance evaluation step.

FIG. 7 shows one particular example of a possible implementation of a sequence transformation processing for converting a call trace in a call sequence. Specifically, FIG. 7 represents an example where call traces collected, for example, in a WCDMA system is converted into a single call sequence according to a sequence model, i.e. one sequence per call.

According to some examples of embodiments, for a conversion into a call sequence, the conversion processing extracts, for example, Layer 3 messages, failure events and certain high level status events from the raw trace, wherein only the message/event type is taken into account (i.e., message/event details are not taken into account according to some examples of embodiments). In the example shown in FIG. 7 Error! Reference source not found., on the left hand side, a schematic representation Layer 3 trace of a call is shown. Specifically, as an example, a case is illustrated where a call setup fails and a specific failure counter is incremented. In detail, at first, as indicated by P1, am RRC connection request is transmitted from the UE 10 to the RNC 20 indicated in FIG. 1, for example. Then, as indicated by P2, RRC connection setup messages are sent from the RNC 20 to the UE 10 (e.g. three times in total). As indicated by P3, an RRC connection release message is sent from the RNC 20 to the UE 10, followed by an RLC SDU sent event at the RNC 20 as indicated by P4. Message P3 and event P4 are repeated two more times. Then, as indicated by P5, a DSP throughput report event occurs at the RNC 20 as indicated by P5. In P6, an RRC ticket failed access phase event happened at the RNC 20, followed by a failure counter increment event at P7 (failure counter M1001C10 incremented, for example).

It is to be noted that the example provided by FIG. 7 represents only one possible call trace, wherein it is possible, for example, that the failure event (i.e. the failure counter increment event indicated by P7) is followed by other events or signaling, e.g. in case the failure is not fatal.

The call trace shown on the left hand side in FIG. 7 is input to the sequence transformation part 40, for example, for conducting the processing for generating the call sequence. During the conversion, according to some examples of embodiments, the processing identifies specific building blocks within the call trace that should be differentiated (e.g., types of Layer 3 messages and events) and assigns a unique identifier for each. The resulting call sequence according to a sequence model of a certain call is a sequence of identifiers which is indicated for example on the right hand side in FIG. 7. Specifically, the messages and events of the call trace identified to be relevant for the further processing are listed in a consecutive order as occurred in the call trace, i.e. P1, P2, P2, P2, P3, P4, P3, P4, P3, P4, P5, P6, P7.

That is, both sides of FIG. 7 show the identified sequence elements which are differentiated by different identifiers P1 to P7. It is to be noted that the original Layer 3 trace may contain a plurality of message details, such as compound data structures including time, sender/receiver information, message attributes, etc., the sequence elements are, according to some examples of embodiments, merely identifiers, such as simple scalar identifiers.

However, according to some further examples of embodiments, there are also alternative examples of a sequence transformation processing being implementable. For example, instead of a rather simple representation of the call by a call sequence as indicated in FIG. 7, sequence elements can be created which carry more information about the associated part of the call trace. That is, besides a corresponding type identifier as indicated in FIG. 7, further information such as a timestamp, a signaling direction, or even the entire associated trace part can be included.

It is to be noted that even though the sequence transformation of FIG. 7 is described in connection with the off-line mode, a corresponding sequence transformation processing is also applicable in the on-line operation mode.

FIGS. 8 to 11 show various diagrams which illustrate an example of a distance evaluation of signaling set sequences or call sequences in accordance with some examples of embodiments. The distance evaluation processing indicated in FIGS. 8 to 11 corresponds to a possible processing of the distance evaluation part 51 of FIG. 6, for example.

With regard to the remaining parts of the call analysis/classification procedure, according to some examples of embodiments, the call sequences generated according to sequence models for calls in the sequence transformation part 40 are processed by using a comparison concept. The basic assumption is that two calls tend to have more similar sequence representation (i.e. comparable sequence elements in more or less the same order) if they increment, for example, the failure counter in the same context and under the same circumstances.

Figure 8:
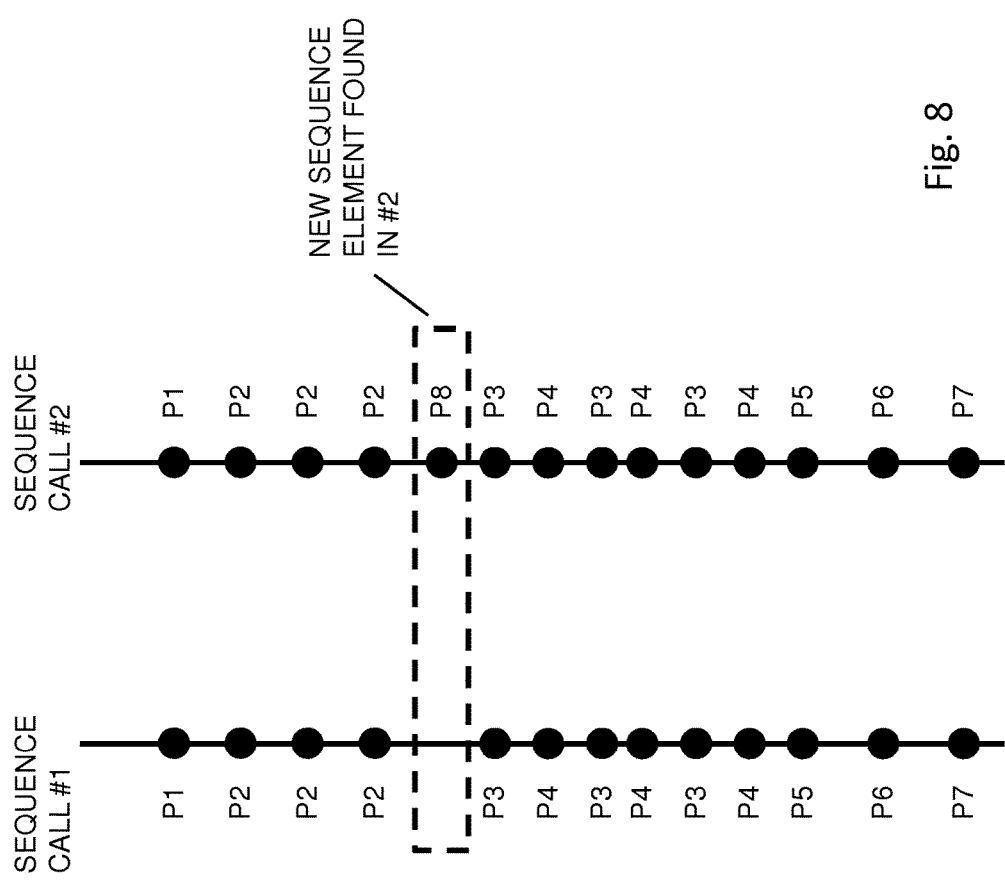
FIG. 8 shows a diagram illustrating an example of a comparison between sequences of two calls according to some examples of embodiments.

FIG. 8 shows a diagram illustrating an example of a comparison between sequences of two calls according to some examples of embodiments. Specifically, a call #1 is transformed in a sequence shown on the left hand side of FIG. 8, wherein the sequence elements correspond to those indicated in the example according to FIG. 7, i.e. P1, P2, P2, P2, P3, P4, P3, P4, P3, P4, P5, P6, P7. On the other hand, a call #2 is transformed in a sequence shown on the right hand side of FIG. 8. By comparing the two sequences in FIG. 8, it is found out that after the analysis of the second call #2 the processing finds a new sequence element (e.g. related to an event like "UP DL Buffer Empty"), which is wedged in the sequence of call #2 between the $4^{th}$ and the $5^{th}$ element (indicated by P8). Otherwise, the two calls have exactly the same sequences.

Next, the general processing for an example of a distance evaluation processing according to some examples of embodiments is described in further detail. Basically, according to the present examples of embodiments, the distance evaluation processing, which is conducted e.g. by the distance evaluation part 51 in FIG. 6, comprises to align call sequences to a specific sequence element contained in each block. For example, according to some examples of embodiments, a predefined reference sequence element is used as an anchor for alignment. For example, the reference element is failure counter increment event in the sequences, i.e. the place of the failure counter event in the call sequence.

It is to be noted that according to some examples of embodiments, an alignment in case of an off-line mode operation is performed within the set of analyzed calls, while in case of an on-line mode operation, the actual call sequence is aligned to a reference set (in case this is not empty).

Figure 9:
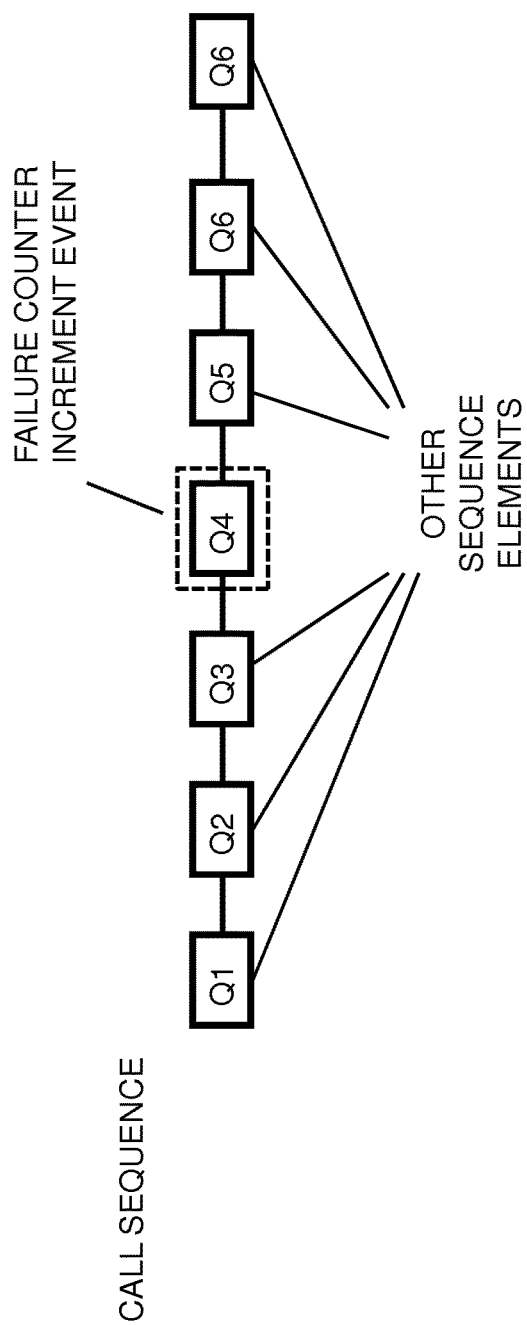
FIG. 9 shows a diagram illustrating an example of a sequence structure of a call according to some examples of embodiments.

FIG. 9 shows a diagram illustrating an example of a sequence structure of a call according to some examples of embodiments. It is to be noted that the structure shown in FIG. 9 describes a basic configuration example used in the further processing related to the distance evaluation based on call sequences, as indicated above.

In detail, the call sequence indicated in FIG. 9 comprises a plurality of sequence elements Q1 to Q6. The number of sequence elements is not limited to the number indicated in FIG. 9, and also the indicators used for identifying the respective sequence elements merely serve for illustrative purposes, i.e. there may be more or less indicators and also two or more sequence elements having the same indicator.

One of the sequence elements, i.e. the element having the indicator Q4, is further highlighted in FIG. 9 (by a dashed box) as being the above mentioned reference sequence element or reference point. That is, according to some examples of embodiments, the sequence element indicated by Q4 is, for example, the event where a specific failure counter is incremented (e.g. failure counter F1 indicated above).

As indicated above, concerning the distance evaluation processing, the motivation for defining a reference point in the processing for finding classes among calls incrementing the same failure counter is the following assumption: calls which increment the counter for the same reason (under the same circumstances) tend to be similar at positions near the counter increment event as they went through the same (or similar) history before hitting the failure.

The goal of sequence alignment in the distance evaluation processing is to move an event of interest (i.e. the reference point) to the same position in each of a plurality of sequences being processed (analyzed). This alignment is described in connection with FIG. 10.

Figure 10:
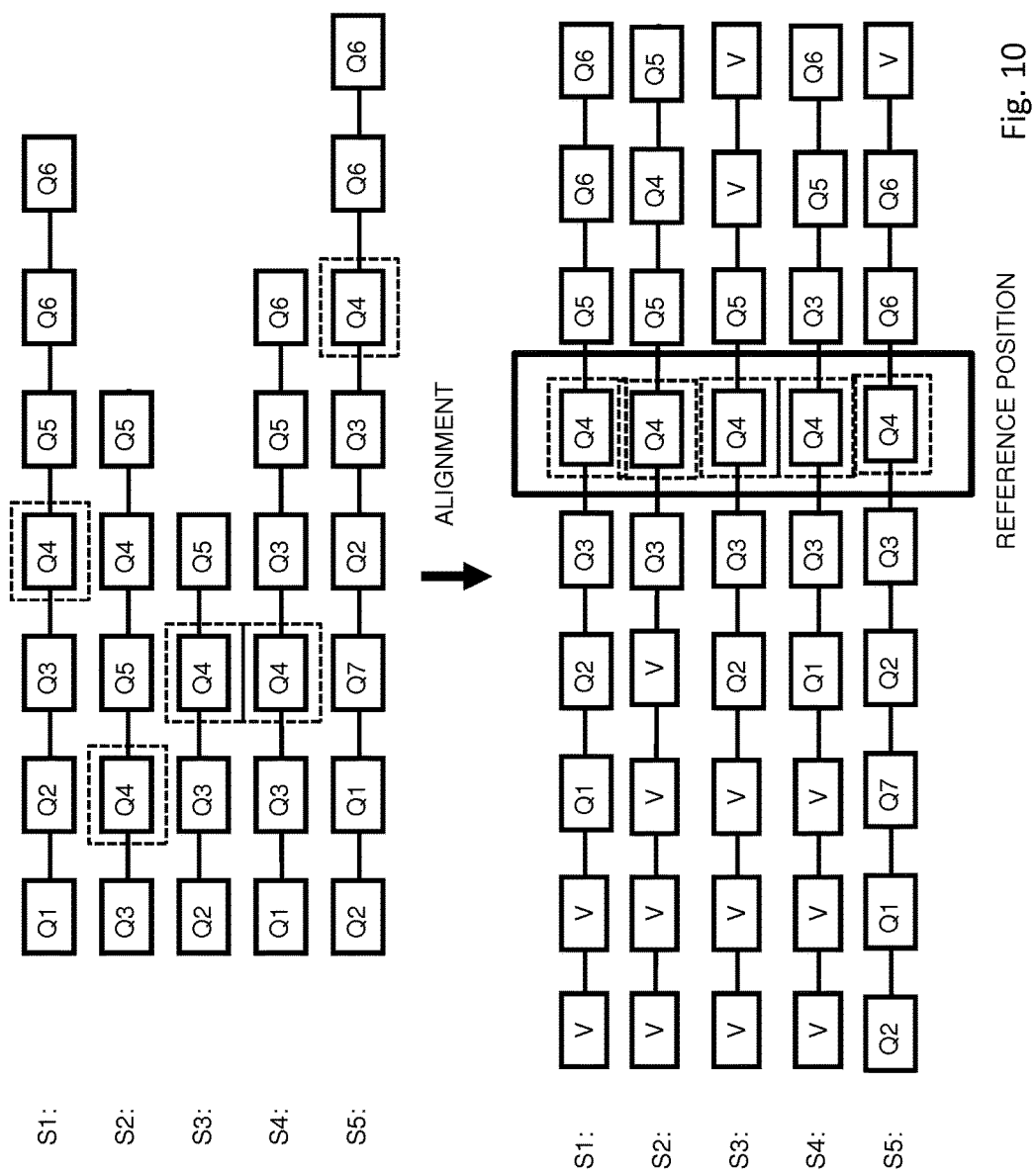
FIG. 10 shows a diagram illustrating an example of an alignment processing of call sequences according to some examples of embodiments.

Specifically, FIG. 10 shows a diagram illustrating an example of an alignment processing of call sequences according to some examples of embodiments. In detail, it is assumed that five call sequences S1 to S5 are input, wherein sequence S1 corresponds to the sequence example according to FIG. 9 while the other sequences S2 to S5 may be different sequences having more or less sequence elements (allocated by a corresponding sequence transformation processing as described above, for example) and/or having the same or different identifiers for sequence elements like S1. It is to be noted that both the number of sequences as well as the contents thereof (number of elements and type of identifiers) shown in FIG. 10 are merely intended for illustrative purposes, and that other examples of embodiments may consider different sequences.

When looking at the upper part of FIG. 10, which represents the situation before the alignment, it can be seen that even though every sequence has the failure counter increment event Q4 as one element, the location thereof in relation to other sequences is different. Consequently, according to examples of embodiments, an alignment of the call sequences S1 to S5 is executed, wherein the failure counter increment event Q4 is used as a common reference point.

The result of the alignment according to some examples of embodiments is shown in the lower part of FIG. 10. As can be seen, the align processing results in a changed order of the call sequences S1 to S5 with regard to each other wherein the sequence elements used as the reference positions are arranged in one row. According to some examples of embodiments, a further processing point in the distance evaluation processing, the alignment processing also changes the sequences S1 to S5 to be of the same size (i.e. having the same number of elements). This is achieved, for example, by filling op the sequences with special void elements which are indicated in the lower part of FIG. 10 by sequence elements indicated by "V". The number of void sequence elements to be included in each call sequence on the left and/or right side of the reference position may depend on different parameters. For example, a maximum length of one of the sequence elements (i.e. the longest one) defines the length of the other sequence elements (and thus the number of void elements to be included), or a predetermined length is predefined which is to be reached by each sequence element, or the like.

Furthermore, it is to be noted that the reference element or position is not limited to be a failure counter increment event (i.e. Q4, for example). According to further examples of embodiments, for example in a case where calls are to be classified having no failure counter at all, a reference point to be used for the alignment can be set by taking into account any particular element in the sequences, such as the first or the last element.

On the basis of the aligned call sequences (e.g. S1 to S5 as shown in FIG. 10), a distance metric can be computed. For example, in the off-line mode considered in the present examples of embodiments, since all sequences of a closed call set can be considered at once, a distance matrix of the sequences is computed. Such a distance matrix can be used by the class assignment processing to find low distance classes of calls.

According to some examples of embodiments, a distance matrix is a symmetric matrix that defines the pair-wise distances between each pair of analyzed calls. That is, for example, the $ij^{th}$ element of the matrix shows the distance of calls i and j.

It is to be noted that various distance metrics can be used to compute the distances of calls. According to some examples of embodiments, one possible approach uses a dynamic Hamming distance (DHD). The DHD defines the distance of two, equal length sequence as edition cost of transposing one sequence to the other. In DHD substitution is the only edit operation, which is associated with a scalar cost. The DHD distance of two calls equals the minimum number of substitutions required to convert one sequence to the other multiplied by the cost of one substitution operation.

According to some examples of embodiments, the cost of substitution is modulated with a position dependent weight function. A corresponding example is illustrated in FIG. 11 which shows a diagram illustrating an example of a processing for distance evaluation of call sequences according to some examples of embodiments.

Figure 11:
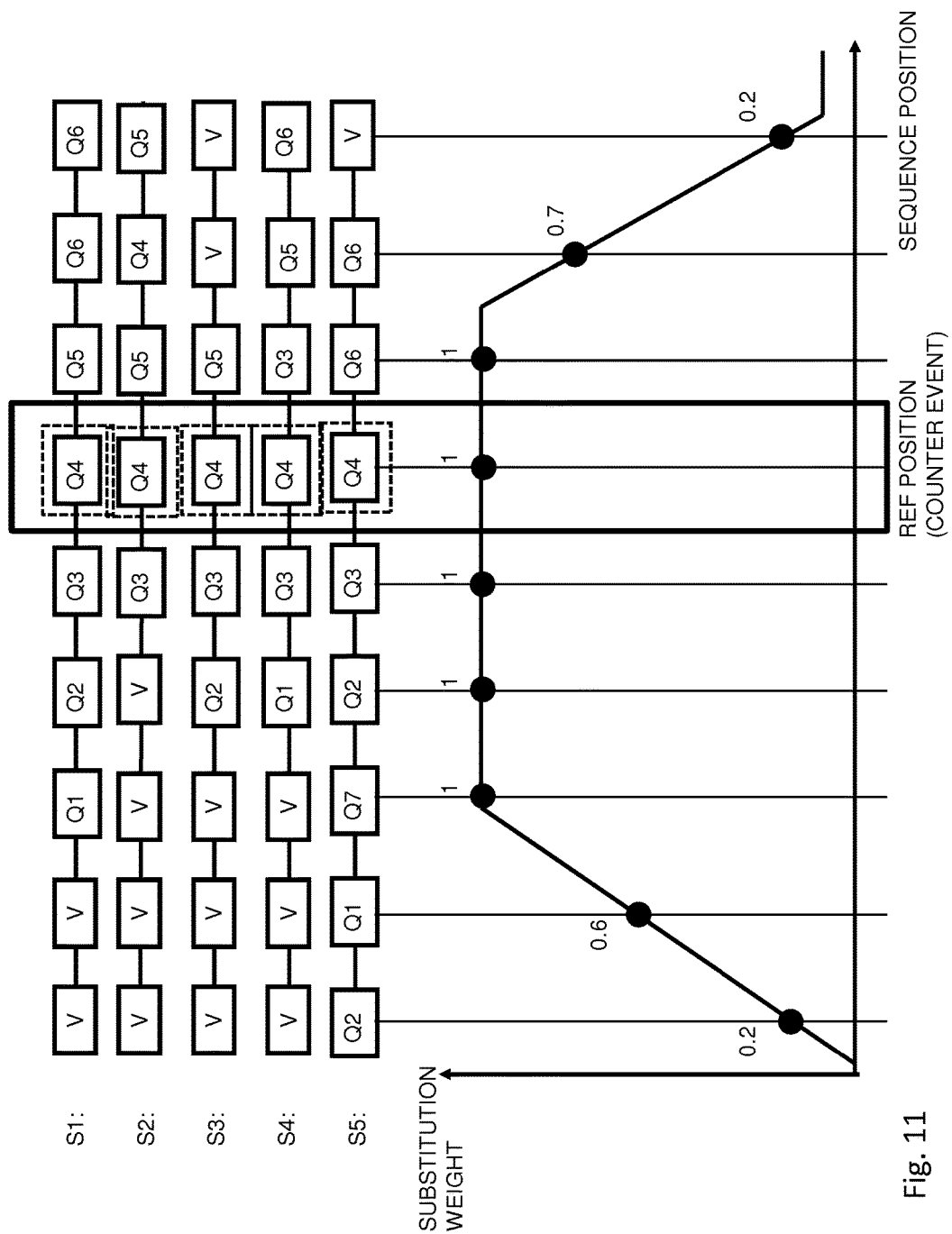
FIG. 11 shows a diagram illustrating an example of a processing for distance evaluation of call sequences according to some examples of embodiments.

Specifically, FIG. 11 seizes the example of an aligned set of sequences S1 to S5 as illustrated in FIG. 10. In the lower part of FIG. 11, a weight function is illustrated which defines a substation weight on the ordinate over a sequence position on the abscissa. As indicated by intersection points of the function graph at respective positions corresponding to a sequence element, wherein the position of the reference point (i.e. the failure counter increment event Q4, for example) is highlighted by a box in FIG. 11. Depending on a distance between a respective position of a sequence event to the reference point, a different value for the substitution weight can be derived from the function indicated in FIG. 11, which is considered in the cost of substitution. In the example shown in FIG. 11, the values for the substitution weights corresponding to the positions in the sequence are 0.2, 0.6, 1, and 0.7, for example, as indicated at the respective positions.

The motivation of the position dependent substitution cost corresponds to that of the alignment, i.e. to focus the analysis on parts of the sequence being close to the reference point or event. According to some examples of embodiments, the weights are defined in such a manner that they emphasize differences in the close neighborhood of the reference event with higher substitution costs, and suppress differences further away from the reference point with lower substitution costs.

It is to be noted that the weight function can be defined in several ways according to some examples of embodiments. That is, the weight function indicated in FIG. 11 is only one possible implementation example, and it is possible to define other forms of weight functions, e.g. as a bell shape function, a square curve function, a triangle curve function, or any other suitable form of function being considered as useful for a specific application case and leading to suitable values for the substitution weights.

Figure 12:
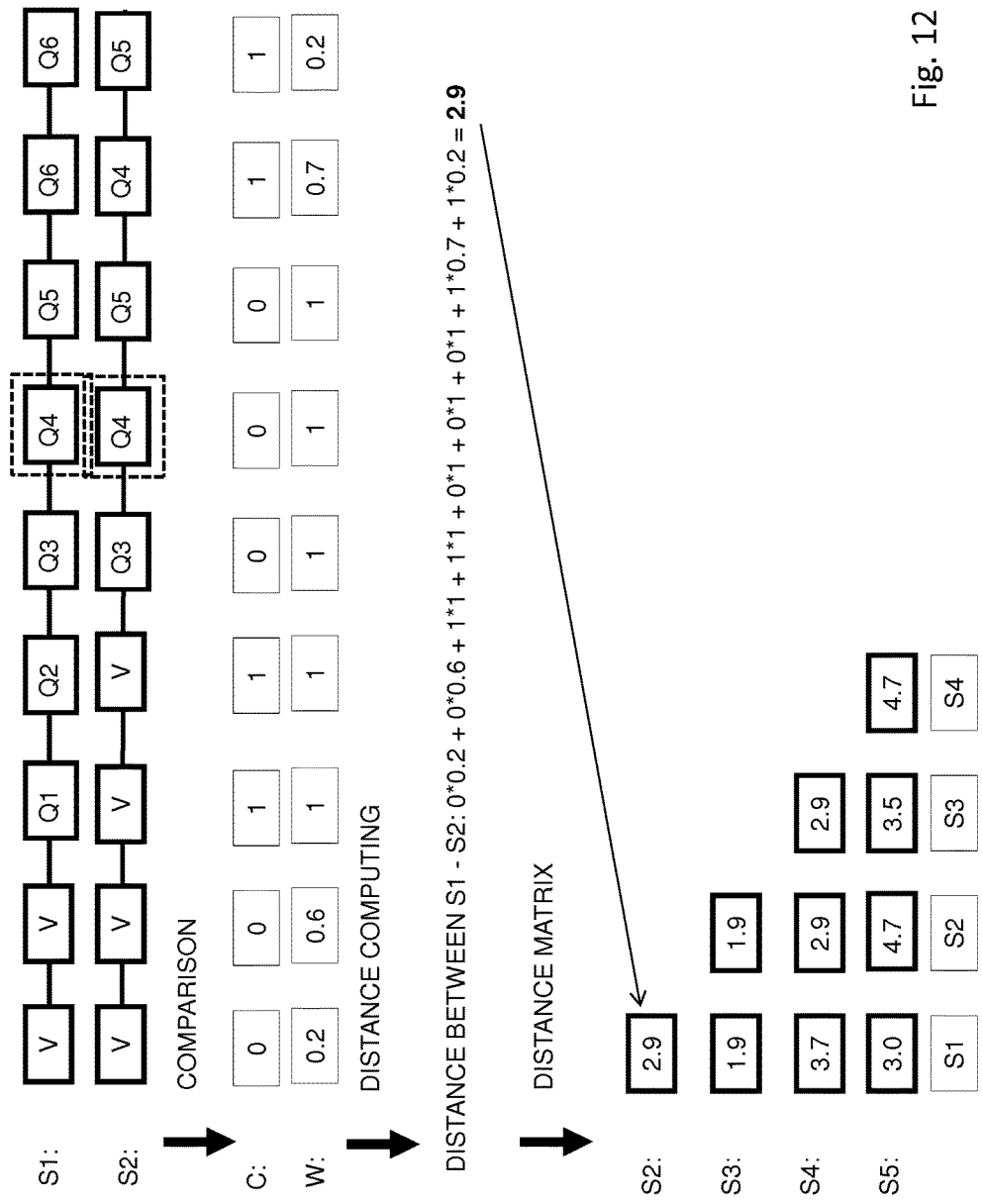
FIG. 12 shows a diagram illustrating an example of a processing for distance evaluation of call sequences according to some examples of embodiments.

FIG. 12 shows a diagram illustrating an example of a processing for distance evaluation of call sequences according to some examples of embodiments. Specifically, FIG. 12 shows a processing example for computing a distance matrix on the basis of aligned call sequences by using a DHD distance and a weighting function according to an example as shown in FIG. 11.

Specifically, in FIG. 12, two sequences S1 and S2 from the diagram of FIG. 11 are selected for showing an example for a processing resulting in a distance matrix.

When comparing the aligned sequences S1 and S2, a comparison result C indicated in the line indicated by an arrow "comparison" indicates, for example, a value "0" for an element comparison resulting in matching sequence elements per position (i.e. the same event or message was part of the call traces leading to the respective sequence S1 and S2), and a value "1" for an element comparison resulting in different elements per position.

In the next line, the substitution weight values of the weight function example according to FIG. 11 corresponding to the respective sequence position are indicated.

Then, a distance computing is possible for determining the distance between the sequences S1 and S2. A corresponding example is indicated in the next line of FIG. 12 indicated by an arrow "distance computing". The distance is computed, according to some examples of embodiments, for example, by adding the products of the comparison value and the substitution weight value of the respective positions. In the example indicated in FIG. 12, the computed distance between S1 and S2 is 2.9.

Then, the value of the distance being computed, for example, as described above, is used as an element of the distance matrix. The example of the distance matrix in FIG. 12, which is indicated by an arrow "distance matrix", reflects the distance computation of the sequences S1 to S5 of FIG. 11, wherein the respective distance values between pairs of sequences (i.e. calls) are entered at the corresponding location, as indicated in FIG. 12. In this manner, the pairwise distances form a distance matrix.

It is to be noted that the computation of the distance matrix as indicated in FIG. 12, for example, is based on the DHD as a distance metric. However, according to some further examples of embodiments, besides the DHD described above, also other sequence distance metrics are usable for computing the distances of calls. For example, sequence distance metrics according to Levenshtein or Jaccard can be implemented.

According to examples of embodiments where a Levenshtein distance is used, an editing distance (which similar to the DHD) is computed, wherein the editing distance allows additional operations instead of only substitution, such as insertion, removal or transposition.

On the other hand, according to examples of embodiments where a Jaccard distance is used, two unordered sets of message elements or the like are compared. The resulting distance indicates how many elements are shared by both sets versus a symmetric difference of the sets. In the context of call comparison, the two sets are created by taking a given number of elements preceding (or succeeding) the reference point (e.g. the failure counter increment event) from each call sequence. The number of elements can be fixed (e.g. taking 10 elements), or based on a time window (such as up to 5 seconds before/after the failure counter), for example in case a timestamp is incorporated into the sequence elements by the sequence transformation processing.

Figure 13:
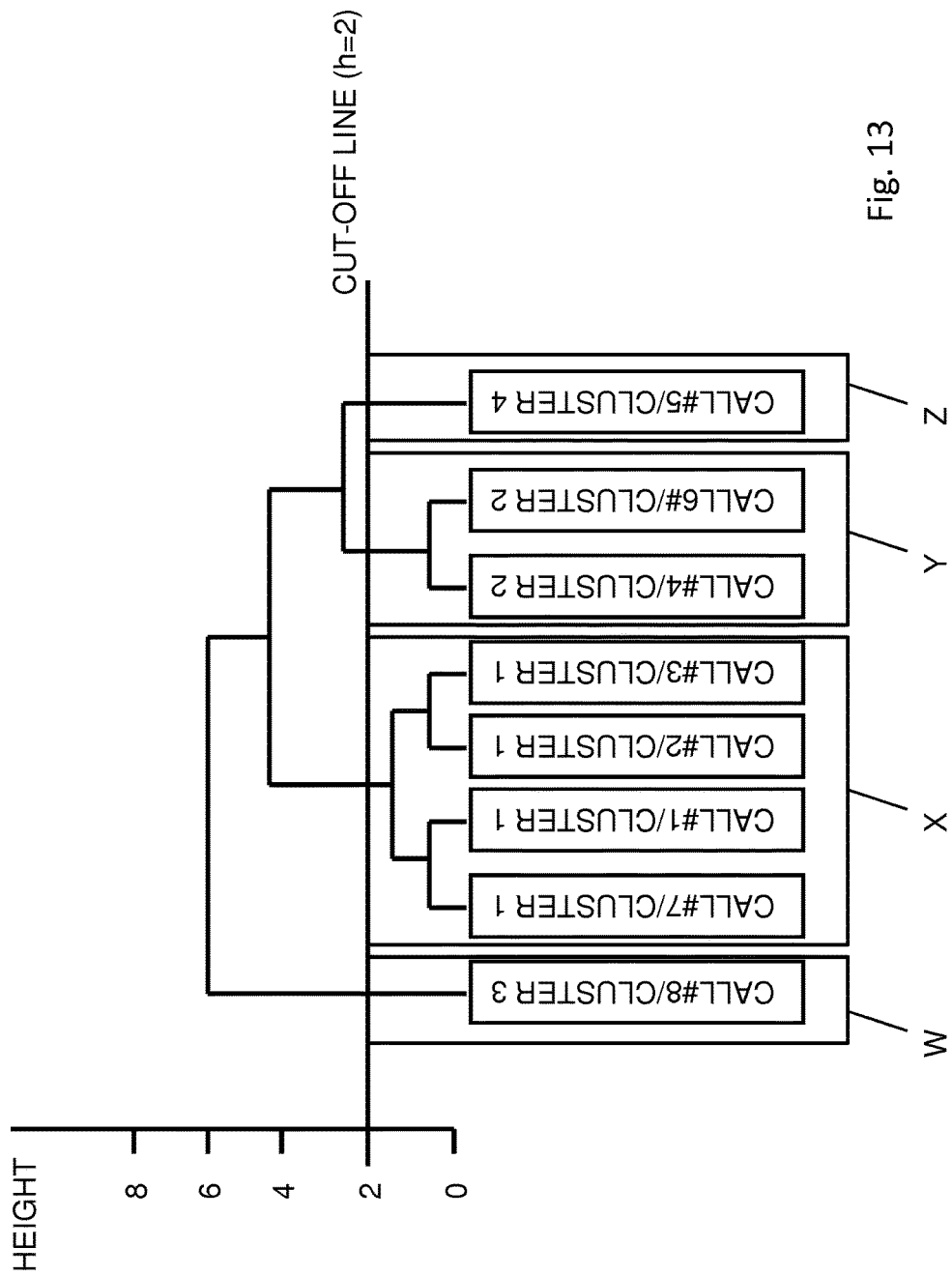
FIG. 13 shows a diagram illustrating a dendrogram of a hierarchical clustering result for calls according to some examples of embodiments.

Next, a processing related to a class assignment is described. According to some examples of embodiments, the class assignment processing, a processing as illustrated in FIG. 13 is executed. FIG. 13 shows a diagram illustrating a dendrogram of a hierarchical clustering result for calls according to some examples of embodiments. The class assignment processing indicated in FIG. 13 corresponds to a possible processing of the class assignment part 52 of FIG. 6, for example.

As indicated above, the distance matrix computed in a distance evaluation processing as described above is used as an input for the class assignment processing. Here, it is tried to find similar groups of sequences according to a selected clustering method. In other words, similarities and dissimilarities between calls (based on the distance matrix) are evaluated in the class assignment processing.

According to some examples of embodiments, the class assignment processing is based, for example, on an agglomerative hierarchical clustering procedure. Hierarchical clustering does not define one specific cluster definition but discovers the hierarchy of all possible clusters within a set of entities.

A corresponding example is indicated in FIG. 13. Here, for illustrative purposes, eight calls #1 to #8 are analyzed and classified. In the example shown in FIG. 13, it is assumed that a part of the calls being processed are equivalent to calls forming call sequences S1 to S5 as used in connection with FIGS. 10 to 12, for example. That is, calls #1 to #5 result in sequences S1 to S5, for example. In addition, there are indicated additional calls (here, calls #6 to #8) which are different to sequences S1 to S5 but which are processed in a corresponding manner and being part of distance matrix being computed as described basically in connection with FIG. 12.

As a matter of course, the number of claims indicated in FIG. 13 represents only an illustrative example and is not limited to eight, but can comprise more or less calls being considered for the processing.

Each call starts within its own cluster, and the clusters are formed in iterative steps. In each step, the two clusters that are the closest to each other are merged (indicated by the linking lines starting from each single cluster). The process ends when all calls become part of the same single cluster (indicated by the uppermost linking line in FIG. 13). The merging rule is referred to as linkage method and defines the method to measure the distance of two clusters. It is to be noted that a possible alternative is a single linkage, which returns the distance of the two closest elements of the compared clusters.

According to the example indicated in FIG. 13, the actual cluster definition is produced by defining a cut height of the dendrogram at a specific value, such as at h=2. Elements or calls which are in the same sub-tree or trees below the cut-off line are assumed to be in the same cluster, while separate sub-trees define different clusters. As a result of the clustering procedure indicated in FIG. 13, i.e. of the clustering visualized as the dendrogram in FIG. 13 (i.e. the agglomerative variant), four clusters 1 to 4 are formed, wherein each cluster represents one call class, such as classes W, X, Y, Z indicated above. In detail, using the example of FIG. 12 for illustrative purposes, calls #1 to #3 (i.e. sequences S1 to S3) are similar enough to be classified into the same call class, wherein the same is assumed to apply for call #7. On the other hand, calls #4 and #5 (i.e. sequences S4 and S5) are determined to be not similar enough to the calls forming cluster 1 and are thus allocated to a respective other cluster (which may or may not comprise other calls being similar to these calls, such as call #6 with regard to call #4).

It is to be noted that the value of the cut height h is not limited to a value of 2. Instead, another useful value can be set, which depends, for example, on an operator setting and is adjusted in accordance with a desired granularity of the resulting classification or the number of original clusters (i.e. calls) to be considered, for example.

Furthermore, it is to be noted that the hierarchical clustering example shown in FIG. 13 is known to be rather complex (e.g. $O(n^3)$, $O(2^n)$)). According to some further examples of embodiments, also alternative clustering procedures may be used in the call classification processing. For example, in case large dataset sizes are to be handles, alternatives may comprise one of k-means or k-medoid, or density based clustering procedures, like Density-Based Spatial Clustering of Applications with Noise (DBSCAN) or Ordering Points To Identify the Clustering Structure (OPTICS).

Thus, as a result of the clustering in the call classification, each cluster is allocated to a class identity and this ID is associated with all call sequences that form the corresponding cluster.

Figure 14:
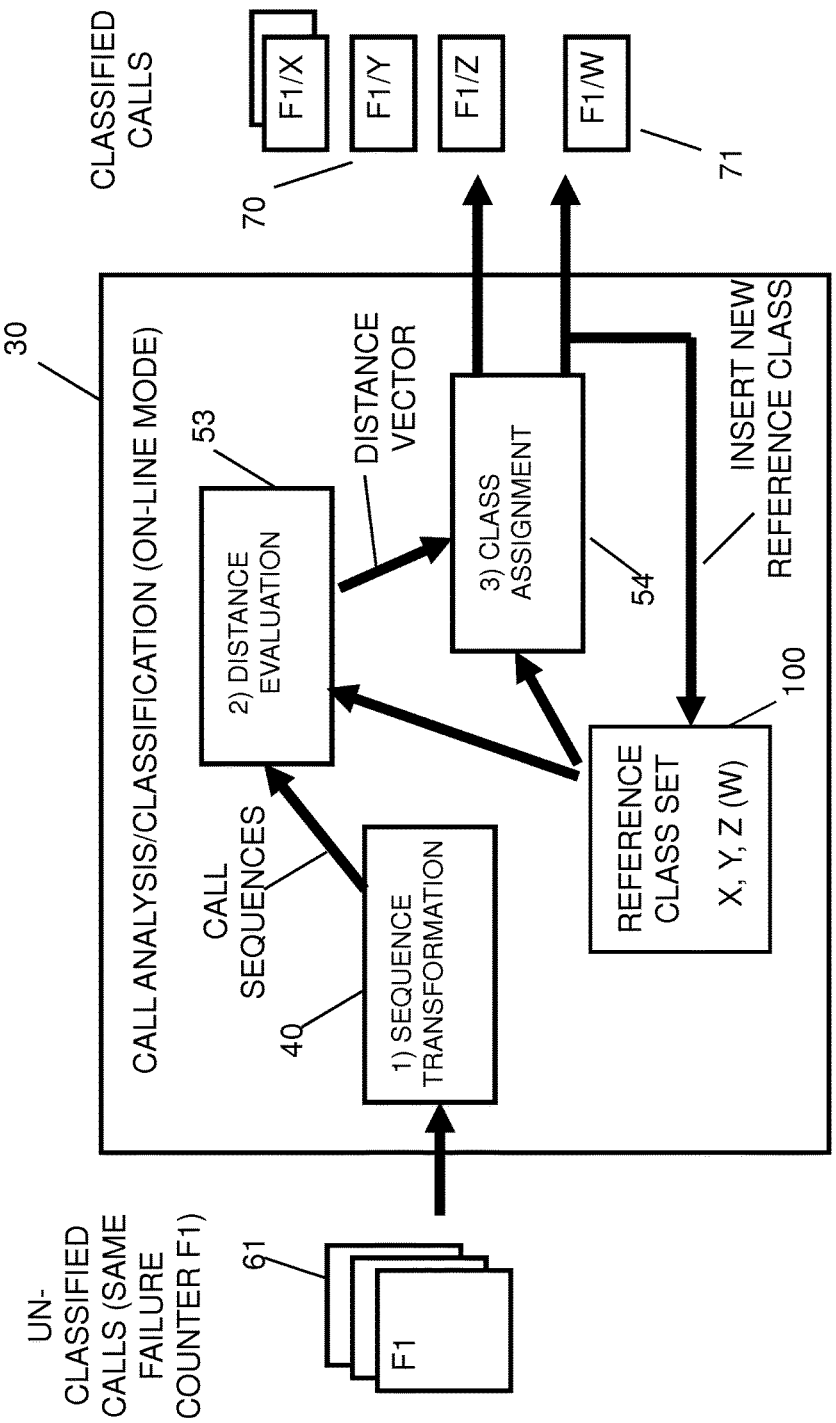
FIG. 14 shows a diagram illustrating an element or function usable for analyzing and classifying signaling sets according to some examples of embodiments.

While in the examples of embodiments described above the off-line mode operation is considered, in the following, the on-line mode operation as indicated above is described in further detail. FIG. 14 shows a diagram illustrating an element or function usable for analyzing and classifying signaling sets according to some examples of embodiments.

Also in the on-line mode, as described above, the workflow of the call classification procedure comprises three main parts, i.e. the sequence transformation part 40 representing the preprocessing instance, a distance evaluation part 53 and a class assignment part 54, which represent the classification instance. In the following, details of the processing conducted by each of the sequence transformation part 40, the distance evaluation part 53 and the class assignment part 54 in the on-line mode processing indicated in FIG. 14 are described according to examples of embodiments.

First, un-classified calls (call traces or trace data) 61 are input and processed in the sequence transformation part 40, wherein resulting call sequences are then delivered to the distance evaluation part 53. For example, the sequence transformation part 40 corresponds to that of the off-line mode, i.e. the processing conducts a sequence transformation so as to create the call sequences from the raw trace data.

In the distance evaluation part 53, a processing according to the on-line mode is conducted, for example by aligning the sequences to a reference sequence set, and by computing pairwise distances of the analyzed sequences as a distance vector according to a selected distance metric. According to some examples of embodiments, the reference class set 100 may be empty at the beginning of the processing and filled with reference classes being identified in the later processing, or it comprises already identified reference class sets. According to some examples of embodiments, corresponding reference class sets may be delivered by an off-line processing, as described above.

That is, according to some examples of embodiments, in a general case, there are at least some reference classes already identified, e.g. based on calls arrived earlier. The currently analyzed call is compared to these reference classes following the selected distance evaluation method. For example, according to some examples of embodiments, the currently analyzed call is first aligned to the class representatives (which are stored aligned). Then the distance of the analyzed call sequence from all class representatives is computed. Then, the farthest member (i.e., with the highest distance) per reference class is selected. This results in the distance vector which hence indicates the computed distances of the analyzed call from each reference class.

The distance vector being the result of the distance evaluation processing is then delivered to the calls assignment part 54, where the sequence is either assigned to the closest reference class or a new reference class is defined when the minimum distance is above a threshold defining e.g. an acceptable amount of difference. The result of the processing is to output classified calls 70, a new call class 71 being identified in the processing, and in the latter case to insert the new reference class in the reference class set 100. For example, according to some examples of embodiments, the analyzed call is inserted into the closest class. Otherwise, in case the distance from the closest class is higher than e.g. a predefined threshold, the currently analyzed call is used to generate a new call class.

As described above, according to some examples of embodiments, one difference between the on-line mode according to the processing indicated in FIG. 14 and the off-line mode is that in the on-line mode the procedure works with the reference class set 100. As indicated above, the reference class set contains call classes identified, for example, in earlier operation cycles or in an preceding off-line mode operation cycle. Each reference set contains one or more reference call sequences that characterize the corresponding call class. According to some examples of embodiments, one single call is analyzed and classified by using one of the classes selected from the reference class set. Alternatively, in case the classification is not proper, a new reference class is created. Furthermore, in case the reference set is empty, the first call defines the first reference class.

Furthermore, according to some examples of embodiments, it is possible to implement different way in the on-line mode to store an actual reference set. For example, one possible implementation is to keep n representative call sequences for each class. Each class is implicitly defined by the selected representatives. It is to be noted that the two extremes are n=1, which means that only the call per cluster is kept, and n=infinite, which means that all previously classified calls are kept. A suitable value of n is to be adapted to operation conditions, such as resource constraints of an environment in which the procedure is applied, wherein it is possible that different values for n are set for different clusters.

It is to be noted that according to examples of embodiments, the results of the call analysis/classification processing (i.e. both on-line or off-line modes) are used in various post-processing procedures.

For example, the results of the call classification procedure are further processed with the purpose of detecting changes compared to a reference class set. In the off-line mode, for example, the new classification result can be compared with previous results (e.g., compare today's results with the results of the previous day). Thus, it is possible, for example, to spot new classes that were not observed so far, or to detect changes of the cardinality of the classes, e.g. one huge class, collecting problematic calls caused by a common reason, diminishes after successfully correcting the root problem On the other, for example in case of the on-line mode, the classification procedure may be configured to store the actual clustering structure at regular time intervals and initiate a comparison of consecutive samples so as to detect changes like those listed above.

Figure 15:
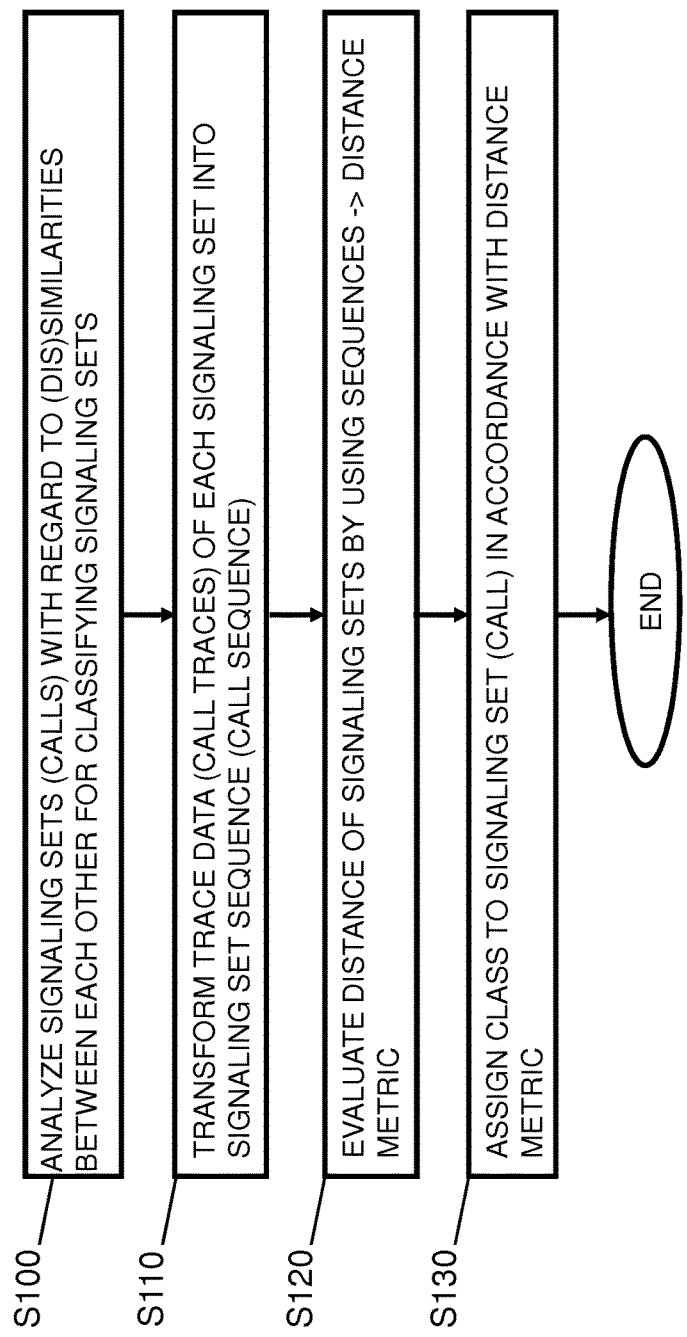
FIG. 15 shows a flow chart of a processing conducted in an element or function for analyzing and classifying signaling sets according to some examples of embodiments.

FIG. 15 shows a flow chart of a processing for analyzing and classifying signaling sets, such as calls as defined above, according to some examples of embodiments. Specifically, the example according to FIG. 15 is related to a procedure conducted by a network element or function configured to act as a network control element or function or to act as an analysis element or function, such as the element or function 30 in the network as depicted e.g. in FIG. 1.

In S100, a plurality of separate signaling sets (such as calls) is analyzed with regard to similarities and dissimilarities between at least two of the plurality of the signaling sets. The signaling sets are classified into at least one class of signaling sets in accordance with a result of the analysis.

According to some examples of embodiments, the plurality of separate signaling sets which are analyzed are preselected in accordance with a type of failure indication comprised in the signaling sets. Alternatively, a specific pre-selection is omitted.

In S110, trace data (i.e. call traces) which represent a respective one of the plurality of signaling sets are transformed. That is, a signaling set sequence is generated according to a sequence model by filtering predetermined information from the trace data.

For example, according to some examples of embodiments, for transforming the trace data which represent a respective one of the plurality of signaling sets, for generating the signaling set sequence according to a sequence model, parts of the trace data are differentiated for identifying specific elements of the trace data. Then, each of the specific elements is assigned to a corresponding identifier, and the signaling set sequence is generated by using the assigned identifiers. Furthermore, according to some examples of embodiments, for transforming the trace data representing a respective one of the plurality of signaling sets for generating the signaling set sequence according to a sequence model, the filtering of the predetermined information from the trace data is adapted to a used processing conducted for evaluating the distance of signaling sets. In this context, results of the transforming of the respective trace data correspond to a common sequence model being suitable for the processing conducted for evaluating the distance of signaling sets.

In S120, a distance of signaling sets is evaluated by using respective signaling set sequences (generated in S110, for example), wherein the distance is indicated by a distance metric. According to some examples of embodiments, for evaluating the distance of the signaling sets, a distance of at least two signaling set sequences derived from the plurality of signaling sets to each other is computed. Alternatively, a distance of signaling set sequences derived from the plurality of signaling sets to at least one pre-stored reference sequence set is computed. According to some examples of embodiments, the distance metric is determined by aligning the signaling set sequences under consideration of a specific element (e.g. a reference point) in each signaling set sequence. The specific element in each signaling set sequence is related, for example, to a failure event or indication (e.g. failure counter update event) in the trace data, a first element of the signaling set sequence, and a last element of the signaling set sequence.

According to some examples of embodiments, the distance metric is determined according to one of a Dynamic Hamming Distance, a Levenshtein distance and a Jaccard distance. Furthermore, according to some examples of embodiments, a result of the distance metric determination is modulated with a weighting factor function or the like which is dependent on a distance between a position in the signaling set sequence to the specific element used for alignment.

In S130, the respective signaling set is assigned to a signaling set class (e.g. call class) on the basis of the distance metric. For example, according to some examples of embodiments, the distance metric is considered for assigning signaling sets which fulfill a predetermined similarity condition (e.g. a predetermined distance value or threshold) with each other to the same signaling set class. On the other hand, signaling sets which do not fulfill the predetermined similarity condition with each other are assigned to another signaling set class.

According to some examples of embodiments, the analyzing of a plurality of separate signaling sets is done in either an off-line mode or an on-line mode. In the off-line mode, according to some examples of embodiments, the plurality of signaling sets is a closed set of previously stored signaling sets. On the other hand, in the on-line mode, according to some examples of embodiments, the plurality of signaling sets is input in a subsequent manner and the analyzing is conducted in accordance with an arrival of signaling sets (e.g. in real time) for an arbitrary time period (being set to an finite or infinite time period, for example).

In the off-line mode, according to some examples of embodiments, at least one of the signaling set classes is used as a reference signaling set class defining a signaling set sequence to be used in a distance evaluation in a signaling set analysis in at least one of the off-line mode and the on-line mode. Furthermore, in the off-line mode, according to some examples of embodiments, the distance of the signaling sets is evaluated by aligning the signaling set sequences to a specific element of the signaling set sequences, e.g. corresponding to a failure counter incrementing event in the trace data. Then, pairwise distances of the signaling set sequences are computed as a distance matrix according to the distance metric. For assigning the signaling sets to a signaling set class, a partitioning or clustering processing is used for identifying subsets of signaling set sequences with a distance being equal to or lower than a predetermined distance by using the distance matrix.

On the other hand, according to some examples of embodiments, in the on-line mode, at least one reference signaling set class, each comprising at least one reference signaling set sequence, is used for evaluating a distance of signaling sets and for assigning the signaling sets to a signaling set class. In case a signaling set is not assignable according to any reference signaling set class, a new reference signaling set class is defined on the basis of the not assignable signaling set. Furthermore, according to some examples of embodiments, in the on-line mode, the distance of the signaling sets is evaluated by aligning the signaling set sequences to a reference signaling set sequence, wherein pairwise distances of the signaling set sequence and the reference signaling set sequence are computed as a distance vector according to the distance metric. Then, on the basis of the distance vector, it is determined whether the signaling set is to be assigned to a signaling set class being the closest signaling set class or defines a new signaling set class.

According to some examples of embodiments, each signaling set is a result of a signaling between a plurality of network elements or functions or within a network element or function, wherein the signaling comprises a series of messages or context data in at least one of a data communication, a voice communication, a message exchange between software blocks involving one or more network elements or functions and protocol stacks. Furthermore, according to some examples of embodiments, the trace data comprise information about at least one of individual events and messages of the signaling set, user plane events, status change events, update events, failure counter events, and properties related to events or messages.

In addition, according to some examples of embodiments, a signaling set sequence being generated according to a sequence model comprises an ordered list of sequence elements representing a relevant part of the trace data, wherein the sequence elements are selected from a plurality of types of sequence elements, each type being differentiated and assigned to a unique identifier, wherein the sequence element comprises at least one of a scalar identifier and an information element derived from the trace data.

According to some examples of embodiments, results of the analysis of the signaling sets are provided in a suitable manner for a post-processing related to changes in analysis results over the time.

Figure 16:
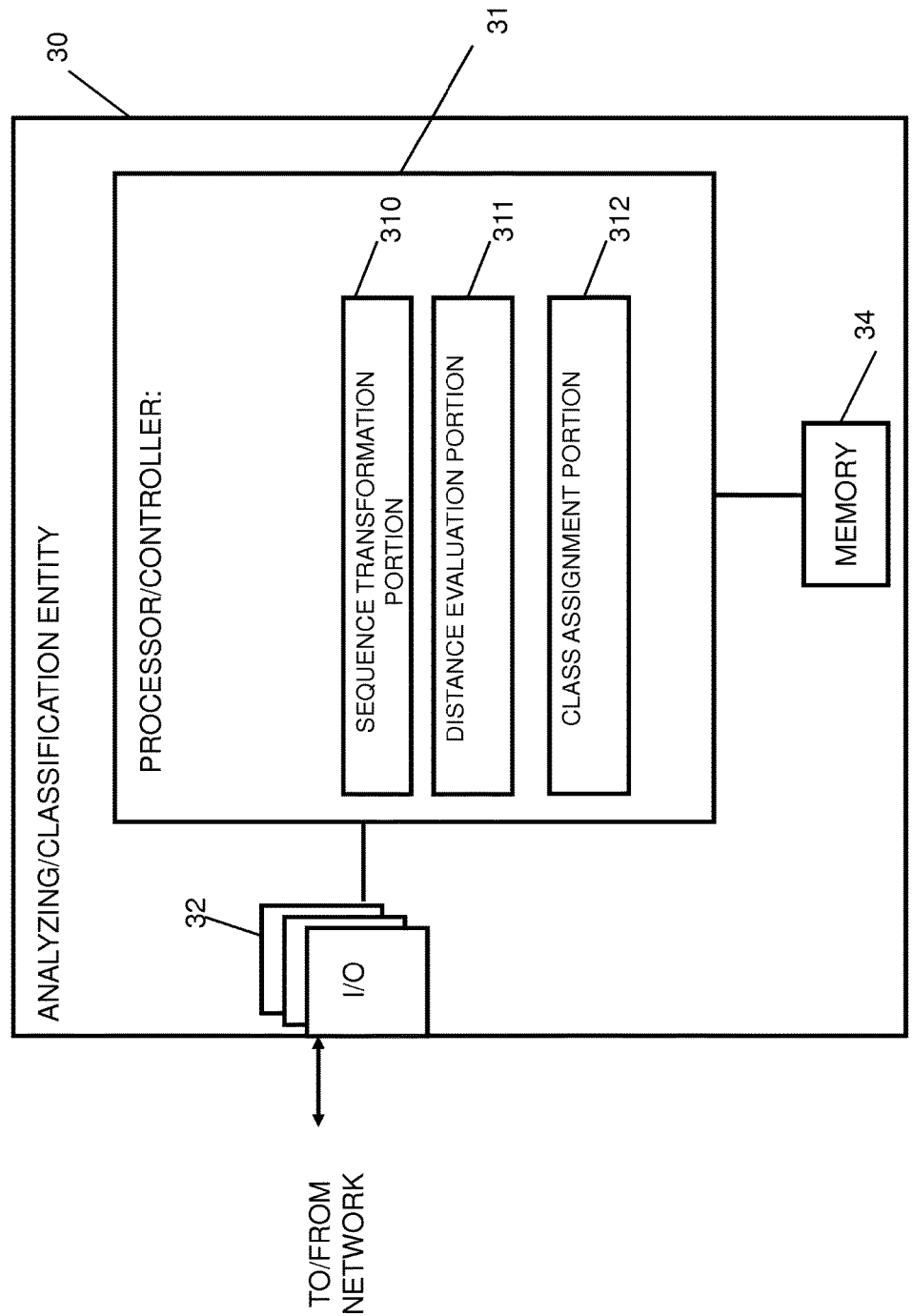
FIG. 16 shows a diagram of a network element acting as an element usable for analyzing and classifying signaling sets according to some examples of embodiments.

FIG. 16 shows a diagram of a network element according to some examples of embodiments, which is configured to implement a procedure for analyzing and classifying signaling sets (calls) as described in connection with some of the examples of embodiments. It is to be noted that the network element, like the network element or function 30 of FIG. 1 which is configured to act as a network control element/function or as an analysis element/function, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element or function shown in FIG. 16 may include a processing circuitry, a processing function, a control unit or a processor 31, such as a CPU or the like, which is suitable for executing instructions given by programs or the like related to the control procedure. The processor 31 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 32 denotes input/output (I/O) units or functions (interfaces) connected to the processor or processing function 31. The I/O units 32 may be used for communicating with a communication network, such as a network control element like the RNC 20. The I/O units 22 and 23 may be a combined unit including communication equipment towards several network elements, or may include a distributed structure with a plurality of different interfaces for different network elements. Reference sign 34 denotes a memory usable, for example, for storing data and programs to be executed by the processor or processing function 31 and/or as a working storage of the processor or processing function 31. It is to be noted that the memory 34 may be implemented by using one or more memory portions of the same or different type of memory.

The processor or processing function 31 is configured to execute processing related to the above described analysis and classification procedure. In particular, the processor or processing circuitry or function 31 includes one or more of the following sub-portions. Sub-portion 310 is a processing portion which is usable as a sequence transformation portion. The portion 310 may be configured to perform processing according to S110 of FIG. 15. Furthermore, the processor or processing circuitry or function 31 may include a sub-portion 311 usable as a portion for evaluating a distance. The portion 311 may be configured to perform a processing according to S110 of FIG. 15. Furthermore, the processor or processing circuitry or function 31 may include a sub-portion 311 usable as a portion for evaluating a distance. The portion 311 may be configured to perform a processing according to S120 of FIG. 15. In addition, the processor or processing circuitry or function 31 may include a sub-portion 312 usable as a portion for assigning a class. The portion 312 may be configured to perform a processing according to S130 of FIG. 15.

It is to be noted that some or all of the examples of embodiments described above may be applied to a partly or fully virtualized environment comprising one or more VNFs.

As described above, according to examples of embodiments, a signaling set analysis and classification mechanism is provided which solves the problem of reducing the manual work needed for the call trace analysis and in particular on the analysis needed for particular counters. That is, according to some examples of embodiments, a mechanism is proposed allowing to efficiently classify call traces beyond existing methods. Instead of classifications being done by examining failure counters/reports associated with the call trace, the actual structure (i.e., the sequence of messages/events that compose the trace) is examined to check if it fits within a certain category or class. These classes are created dynamically from the analysis itself.

According to some examples of embodiments, a classification of call traces is made by distilling them into a simplified model, which is then compared to other trace models using e.g. DHD or the like. The distance calculation is used to bin or classify the calls according to their trace data into a certain class. According to some examples of embodiments, the set of distances is clustered hierarchically in order to determine automatically from the data what classes exist.

As indicated above, some examples of embodiments allow to conduct a call classification beyond failure counters (e.g. automatically create sub-classes of calls that are significantly different despite incrementing the same failure counter), to identify problematic calls before they escalate into more serious hard failures, to classify a call independently of failure counters so as to detect underlying problems, to automatically recognize new types of failures e.g. for initiating a new dedicated counter, and to support verification of changes.

Moreover, according to some examples of embodiments, it is possible, for troubleshooting failed calls beyond failure counters or reason codes, to analyze the properties and the sequence of the calls. Hence, a troubleshooting framework can be provided which is capable of providing automated analysis or classification of failed calls in addition to (or independently from) a conventional failure counter or code.

Furthermore, even though in some of the examples of embodiments described above the signaling set analysis and classification procedure is described to be conducted in the analysis element 30, further examples of embodiments of the invention are not limited to such an element. For example, instead of a dedicated network element, it is possible that another existing node or element or function acts as the analysis element, such as an RNC, MSS, TAS, MGW, BGW etc.

In addition, according to another example of embodiments, there is provided an apparatus comprising means for analyzing a plurality of separate signaling sets with regard to similarities and dissimilarities between at least two of the plurality of the signaling sets for classifying each signaling set into at least one class of signaling sets in accordance with a result of the analysis, wherein the analyzing means comprises preprocessing means for transforming trace data representing a respective one of the plurality of signaling sets for generating a signaling set sequence according to a sequence model by filtering predetermined information from the trace data, and classification means for evaluating a distance of signaling sets by using respective signaling set sequences, wherein the distance is indicated by a distance metric, and for assigning the respective signaling set to a signaling set class on the basis of the distance metric.

Furthermore, according to some other examples of embodiments, the above defined apparatus may further comprise means for conducting at least one of the processing defined in the above described methods, for example a method according that described in connection with FIG. 15.

It should be appreciated that an access technology via which traffic is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user equipment may be implemented with a corresponding apparatus, such as a relay node. An example of such a relay node is a layer 3 relay (self-backhauling relay) towards a base station or RNC. The user device typically refers to a portable computing device that includes wireless mobile communication devices operating with or without a subscriber identification module (SIM), including, but not limited to, the following types of devices: a mobile station (mobile phone), smart phone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus comprising:
at least one processing circuitry,
and
at least one memory for storing instructions to be executed by the processing circuitry, wherein
the at least one memory and the instructions are configured to, with the at least one processing circuitry, cause the apparatus at least:
to analyze a plurality of separate signaling sets with regard to similarities and dissimilarities between at least two of the plurality of the signaling sets for classifying each signaling set into at least one class of signaling sets in accordance with a result of the analysis,
wherein the analyzing comprises
transforming trace data representing a respective one of the plurality of signaling sets for generating a signaling set sequence according to a sequence model by filtering predetermined information from the trace data, wherein the signaling set sequence being generated comprises an ordered list of sequence elements representing a relevant part of the trace data, wherein the sequence elements are selected from a plurality of types of sequence elements, each type being differentiated and assigned to a unique identifier, wherein the sequence element comprises at least one of a scalar identifier and an information element derived from the trace data,
evaluating a distance of signaling sets by using respective signaling set sequences, wherein the distance is indicated by a distance metric, and
assigning the respective signaling set to a signaling set class on the basis of the distance metric.

2. The apparatus according to claim 1, wherein
each signaling set is a result of a signaling between a plurality of network elements or functions or within a network element or function, the signaling comprising a series of messages or context data in at least one of a data communication, a voice communication, a message exchange between software blocks involving one or more network elements or functions and protocol stacks, and
the trace data comprise information about at least one of individual events and messages of the signaling set, user plane events, status change events, update events, failure counter events, and properties related to events or messages.

3. The apparatus according to claim 1, wherein the at least one memory and the instructions are further configured to, with the at least one processing circuitry, cause the apparatus at least:
to preselect the plurality of separate signaling sets for analyzing in accordance with a type of failure indication comprised in the signaling sets.

4. The apparatus according to claim 1, wherein the at least one memory and the instructions are further configured to, with the at least one processing circuitry, cause the apparatus at least:
for transforming the trace data representing a respective one of the plurality of signaling sets for generating the signaling set sequence according to a sequence model, to differentiate parts of the trace data for identifying specific elements,
to assign to each specific element a corresponding identifier, and
to generate the signaling set sequence by using the assigned identifiers.

5. The apparatus according to any of claim 1, wherein the at least one memory and the instructions are further configured to, with the at least one processing circuitry, cause the apparatus at least:
to adapt, for transforming the trace data representing a respective one of the plurality of signaling sets for generating the signaling set sequence according to a sequence model, the filtering of the predetermined information from the trace data to a processing conducted for evaluating the distance of signaling sets, wherein results of the transforming of the respective trace data correspond to a common sequence model being suitable for the processing conducted for evaluating the distance of signaling sets.

6. The apparatus according to any of claim 1, wherein the at least one memory and the instructions are further configured to, with the at least one processing circuitry, cause the apparatus at least:

to compute, for evaluating the distance of the signaling sets, a distance of at least two signaling set sequences derived from the plurality of signaling sets to each other or a distance of signaling set sequences derived from the plurality of signaling sets to at least one pre-stored reference sequence set, wherein the distance metric is determined by aligning the signaling set sequences under consideration of a specific element in each signaling set sequence, wherein the specific element in each signaling set sequence is related to one of a failure event in the trace data, a first element of the signaling set sequence, and a last element of the signaling set sequence.

7. The apparatus according to claim 6, wherein the at least one memory and the instructions are further configured to, with the at least one processing circuitry, cause the apparatus at least:

to determine, as the distance metric, one of a Dynamic Hamming Distance, a Levenshtein distance and a Jaccard distance, and to modulate a result of the distance metric determination with a weighting factor function being dependent on a distance between a position in the signaling set sequence to the specific element used for alignment.

8. The apparatus according to any of claim 1, wherein the at least one memory and the instructions are further configured to, with the at least one processing circuitry, cause the apparatus at least:

to consider the distance metric for assigning signaling sets which fulfill a predetermined similarity condition with each other to the same signaling set class and for assigning signaling sets which do not fulfill the predetermined similarity condition with each other to another signaling set class.

9. The apparatus according to any of claim 1, wherein the at least one memory and the instructions are further configured to, with the at least one processing circuitry, cause the apparatus at least:

to analyze a plurality of separate signaling sets in one of an off-line mode and an on-line mode, wherein in the off-line mode, the plurality of signaling sets is a closed set of previously stored signaling sets, and in the on-line mode, the plurality of signaling sets is input in a subsequent manner and the analyzing is conducted in accordance with an arrival of signaling sets for an arbitrary time period.

10. The apparatus according to claim 9, wherein the at least one memory and the instructions are further configured to, with the at least one processing circuitry, cause the apparatus at least:

in the off-line mode, to use at least one of the signaling set classes as a reference signaling set class defining a signaling set sequence to be used in a distance evaluation in a signaling set analysis in at least one of the off-line mode and the on-line mode.

11. The apparatus according to claim 9, wherein the at least one memory and the instructions are further configured to, with the at least one processing circuitry, cause the apparatus at least:

in the off-line mode, to evaluate the distance of the signaling sets by aligning the signaling set sequences to a specific element of the signaling set sequences corresponding to a failure counter incrementing event in the trace data, to compute pairwise distances of the signaling set sequences as a distance matrix according to the distance metric, and to use, for assigning the signaling sets to a signaling set class, a partitioning or clustering processing for identifying subsets of signaling set sequences with a distance being equal to or lower than a predetermined distance by using the distance matrix.

12. The apparatus according to claim 9, wherein the at least one memory and the instructions are further configured to, with the at least one processing circuitry, cause the apparatus at least:

in the on-line mode, to use at least one reference signaling set class each comprising at least one reference signaling set sequence for evaluating a distance of a signaling sets and for assigning the signaling sets to a signaling set class, and to define, in case a signaling set is not assignable according to any reference signaling set class, a new reference signaling set class on the basis of the not assignable signaling set.

13. The apparatus according to claim 9, wherein the at least one memory and the instructions are further configured to, with the at least one processing circuitry, cause the apparatus at least:

in the on-line mode, to evaluate the distance of the signaling sets by aligning the signaling set sequences to a reference signaling set sequence, to compute pairwise distances of the signaling set sequence and the reference signaling set sequence as a distance vector according to the distance metric, to determine on the basis of the distance vector whether the signaling set is to be assigned to a signaling set class being the closest signaling set class or defines a new signaling set class.

14. The apparatus according to claim 1, wherein the at least one memory and the instructions are further configured to, with the at least one processing circuitry, cause the apparatus at least:

to provide results of the analysis of the signaling sets for a post-processing related to changes in analysis results over the time.

15. The apparatus according to claim 1, wherein the apparatus is included in a network element or function configured to act as a network control element or function or to act as an analysis element or function, wherein the network is communication network.

16. A method comprising:

analyzing a plurality of separate signaling sets with regard to similarities and dissimilarities between at least two of the plurality of the signaling sets for classifying each signaling set into at least one class of signaling sets in accordance with a result of the analysis, wherein the analyzing comprises transforming trace data representing a respective one of the plurality of signaling sets for generating a signaling set sequence according to a sequence model by filtering predetermined information from the trace data, wherein the signaling set sequence being generated comprises an ordered list of sequence elements representing a relevant part of the trace data, wherein the sequence elements are selected from a plurality of types of sequence elements, each type being differentiated and assigned to a unique identifier, wherein the sequence element comprises at least one of a scalar identifier and an information element derived from the trace data, evaluating a distance of signaling sets by using respective signaling set sequences, wherein the distance is indicated by a distance metric, and assigning the respective signaling set to a signaling set class on the basis of the distance metric.

17. The method according to claim 16, further comprising:

computing, for evaluating the distance of the signaling sets, a distance of at least two signaling set sequences derived from the plurality of signaling sets to each other or a distance of signaling set sequences derived from the plurality of signaling sets to at least one pre-stored reference sequence set, wherein the distance metric is determined by aligning the signaling set sequences under consideration of a specific element in each signaling set sequence, wherein the specific element in each signaling set sequence is related to one of a failure event in the trace data, a first element of the signaling set sequence, and a last element of the signaling set sequence.

18. A computer program product, comprising a computer usable medium having a computer readable program code embodied therein, the computer readable program code adapted to execute a process comprising:

analyzing a plurality of separate signaling sets with regard to similarities and dissimilarities between at least two of the plurality of the signaling sets for classifying each signaling set into at least one class of signaling sets in accordance with a result of the analysis, wherein the analyzing comprises transforming trace data representing a respective one of the plurality of signaling sets for generating a signaling set sequence according to a sequence model by filtering predetermined information from the trace data, wherein the signaling set sequence being generated comprises an ordered list of sequence elements representing a relevant part of the trace data, wherein the sequence elements are selected from a plurality of types of sequence elements, each type being differentiated and assigned to a unique identifier, wherein the sequence element comprises at least one of a scalar identifier and an information element derived from the trace data, evaluating a distance of signaling sets by using respective signaling set sequences, wherein the distance is indicated by a distance metric, and assigning the respective signaling set to a signaling set class on the basis of the distance metric.

\* \* \* \* \*